(12) United States Patent
Jasiewicz

(10) Patent No.: US 11,304,436 B2
(45) Date of Patent: *Apr. 19, 2022

(54) DESTEMMING DEVICES

(71) Applicant: Trick Concepts, Torrance, CA (US)

(72) Inventor: David Jasiewicz, Torrance, CA (US)

(73) Assignee: TRICK CONCEPTS, Torrance, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,695

(22) Filed: Sep. 3, 2021

(65) Prior Publication Data

US 2021/0392940 A1 Dec. 23, 2021

Related U.S. Application Data

(63) Continuation of application No. 17/108,132, filed on Dec. 1, 2020.

(60) Provisional application No. 62/945,441, filed on Dec. 9, 2019.

(51) Int. Cl.
*A23N 15/02* (2006.01)
*A01D 46/28* (2006.01)

(52) U.S. Cl.
CPC ............. *A23N 15/02* (2013.01); *A01D 46/28* (2013.01)

(58) Field of Classification Search
CPC ...... A23N 15/02; A23N 15/025; A23N 15/04; A23N 7/00; A23N 15/00; A23N 4/06; A01D 46/28; A23L 1/2123
USPC ......... 99/536, 585, 635, 636, 637, 638, 639, 99/640, 641, 643
See application file for complete search history.

(56) References Cited

U.S. PATENT DOCUMENTS

| | | | | |
|---|---|---|---|---|
| 2,731,051 | A * | 1/1956 | Wormser | A23N 15/02 99/637 |
| 5,203,259 | A * | 4/1993 | Miedema | A23N 15/02 492/36 |
| 2021/0237093 | A1 * | 8/2021 | Archie | B02C 4/08 |

* cited by examiner

*Primary Examiner* — Phuong T Nguyen
(74) *Attorney, Agent, or Firm* — Fay Sharpe LLP

(57) ABSTRACT

A destemming device includes a housing, a motor, and a belt system configured to fit within the housing. The housing includes at least one cutting aperture. The belt system includes a first belt assembly and a second belt assembly. The first belt assembly includes a first plurality of rollers and a first gripper belt extending around the first plurality of rollers. The second belt assembly includes a second plurality of rollers and a second gripper belt extending around the second plurality of rollers. The first gripper belt and the second gripper belt define a nip. The at least one cutting aperture is aligned with the nip. The motor is operatively connected to the belt system.

20 Claims, 22 Drawing Sheets

DESTEMMING DEVICES

CROSS-REFERENCE TO RELATED APPLICATIONS

This application is a continuation of U.S. patent application Ser. No. 17/108,132, filed Dec. 1, 2020, which claims priority to U.S. Provisional Patent Application Ser. No. 62/945,441, filed Dec. 9, 2019, which is incorporated by reference herein in its entirety.

BACKGROUND

The present disclosure relates to devices and methods for destemming plants. A destemming device, also known as a bucker, a bucking machine, a destemmer, a debudder, etc., is a harvesting machine that separates buds, leaves, flowers, etc. from stems. The use of a destemming device can significantly increase the efficiency of a harvesting operation by eliminating the need for destemming to be performed manually (e.g., with a knife or scissors).

However, significant manual labor is still required to prepare plants for destemming with known destemming devices since the bulk plant material must still be broken down into small enough pieces to fit into dies/cutting apertures at the front of the machine. Additionally, relatively long (e.g., 5 inches) stem sections are required to facilitate proper gripping of the stem within such devices.

Existing machines have two large, fixed rollers which are misaligned in some cases to provide gaps to grab the plant. Among other things, the fixed distance causes the stem to want to move to a large gap in the rollers and improper gripping may result, especially when the stem is inserted into an inappropriately sized cutting aperture.

It would be desirable to develop new destemming devices and methods which address the aforementioned deficiencies of known buckers.

BRIEF DESCRIPTION

Disclosed herein are destemming devices and methods.

In this regard, disclosed in various embodiments are destemming devices including a housing comprising at least one cutting aperture; a motor; and a belt system configured to fit within the housing. The belt system includes a first belt assembly and a second belt assembly. The first belt assembly includes a first plurality of rollers; and a first gripper belt extending around the first plurality of rollers. The second belt assembly includes a second plurality of rollers; and a second gripper belt extending around the second plurality of rollers. The first gripper belt and the second gripper belt define a nip. The at least one cutting aperture is aligned with the nip. The motor is operatively connected to the belt system.

In some embodiments, the first belt assembly is an upper belt assembly and the second belt assembly is a lower belt assembly located vertically below the upper belt assembly.

The motor may be operatively connected to the belt system via a power transmission belt extending around a drive pulley associated with the motor and a driven pulley associated with at least one roller of the first plurality of rollers and/or the second plurality of rollers. Alternatively, a gear train may be utilized.

In some embodiments, the destemming device further includes a chain drive operatively connecting a first sprocket associated with at least one first roller of the first plurality of rollers and a second sprocket associated with at least one second roller of the second plurality of rollers.

The destemming device may further include a control unit electrically connected to the motor.

In some embodiments, the destemming device further includes a user interface associated with the control unit. The user interface may include an on/off switch; an emergency stop button; and a dial for controlling belt speed.

The dial may allow switching between a plurality of discrete, predetermined belt speeds. Alternatively, the dial may permit selection of belt speed in a continuously variable manner between predetermined upper and lower limits.

In some embodiments, the destemming device further includes a slide and/or receptacle outside the housing and beneath the at least one cutting aperture.

The destemming device may further include a jam removal system for increasing the nip (i.e., the distance between the gripper belts) to facilitate removing a jam.

In some embodiments, the jam removal system includes an actuator, such as a button, operatively connected to at least one of the first belt assembly and the second belt assembly. Activating the button causes an increase in the distance between the gripper belts.

The actuator may be a foot pedal.

In some embodiments, the jam removal system further includes a first lever extending between the foot pedal and a base on the destemming device; and a second lever extending between the first lever and the second belt assembly.

Optionally, the first belt assembly comprises a first rail and a second rail; and the first plurality of rollers extend between the first rail and the second rail.

In some embodiments, at least one support bar extends between the first rail and the second rail.

Optionally, the second belt assembly comprises a third rail and a fourth rail; and the second plurality of rollers extend between the third rail and the fourth rail.

In some embodiments, least one support bar extends between the third rail and the fourth rail.

The destemming device may further include a base such as a rectangular base.

In some embodiments, a plurality of support legs extends between the housing and the base.

The destemming device may further include a plurality of wheels connected to the base.

Disclosed in other embodiments are destemming methods which utilize the destemming device as described herein. The destemming methods generally include inserting a stem into a cutting aperture of the at least one cutting aperture of the destemming device.

These and other non-limiting characteristics of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

Figure 1:
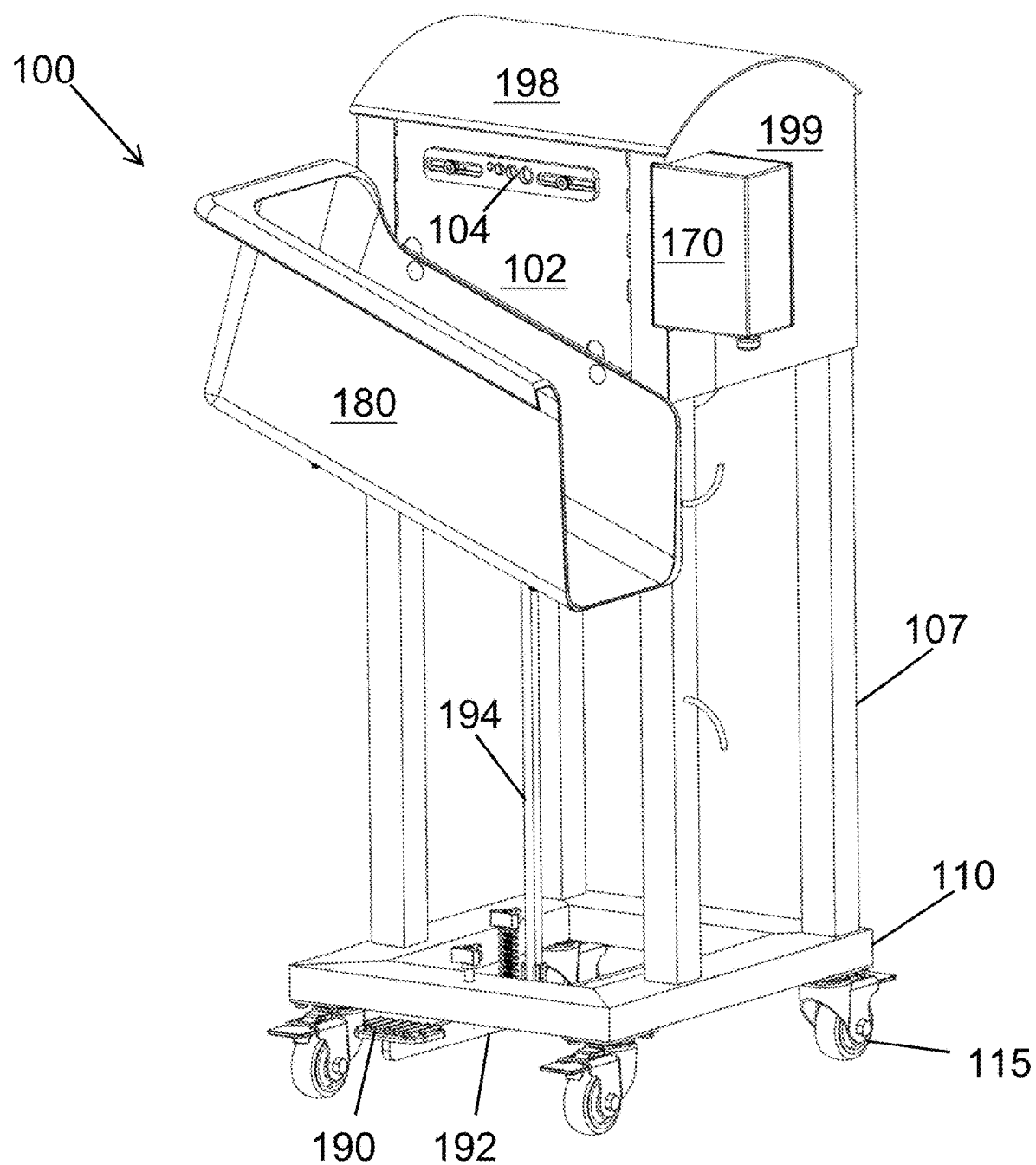
FIG. 1 is a front perspective view of a destemming device in accordance with some embodiments of the present disclosure.

A more complete understanding of the compositions and methods disclosed herein can be obtained by reference to the accompanying drawings. These figures are merely schematic representations based on convenience and the ease of demonstrating the present disclosure, and are, therefore, not intended to define or limit the scope of the exemplary embodiments.

Although specific terms are used in the following description for the sake of clarity, these terms are intended to refer only to the particular structure of the embodiments selected for illustration in the drawings and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification and in the claims, the term "comprising" may include the embodiments "consisting of" and "consisting essentially of." The terms "comprise(s)," "include(s)," "having," "has," "can," "contain(s)," and variants thereof, as used herein, are intended to be open-ended transitional phrases, terms, or words that require the presence of the named ingredients/steps and permit the presence of other ingredients/steps. However, such description should be construed as also describing compositions or processes as "consisting of" and "consisting essentially of" the enumerated ingredients/steps, which allows the presence of only the named ingredients/steps, along with any impurities that might result therefrom, and excludes other ingredients/steps.

Numerical values in the specification and claims should be understood to include numerical values which are the same when reduced to the same number of significant figures and numerical values which differ from the stated value by less than the experimental error of conventional measurement technique of the type described in the present application to determine the value.

All ranges disclosed herein are inclusive of the recited endpoint and independently combinable (for example, the range of "from 2 to 10" is inclusive of the endpoints, 2 and 10, and all the intermediate values).

As used herein, approximating language such as "about" may be applied to modify any quantitative representation that may vary without resulting in a change in the basic function to which it is related. The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number.

The present disclosure relates to destemming devices which utilize a belt system instead of two large, conventional rollers. The belt system includes a first (e.g., upper) belt assembly and a second (e.g., lower) belt assembly. The belt system could also be rotated 90° so that the nip between the belts extends vertically. In vertical nip embodiments, the stem end of the plant matter may be fed through the front or the top of the device. In top-feed systems, destemmed plant matter may be collected from the top of the device manually or via an at least partially automated process. For example, a brush or a wiper may be included with the device. A receptacle for collecting stems may be provided beneath the belt system, either within or external to the housing.

Nips oriented at angles between horizontal and vertical (e.g., about 15°, about 20°, about 25°, about 30°, about 35°, about 40°, about 45°, about 50°, about 55°, about 60°, about 65°, about 70°, and about 75°, with respect to horizontal) are also contemplated. Ranges of "up to" the aforementioned angles and all ranges defined by any two of the aforementioned angles are also contemplated. Non-limiting examples include about 15° to about 75°, about 20° to about 70°, about 25° to about 65°, about 30° to about 60°, about 35° to about 55°, and about 40° to about 50°.

Each belt assembly includes a plurality of rollers extending between and perpendicular to opposing rails, and a belt around the rollers. In some embodiments, each belt assembly includes a feed side roller, a backside roller, and optionally one or more intermediate rollers. The intermediate rollers may be omitted in some embodiments. In some embodiments, a rigid, low friction block is used instead of intermediate rollers. The block places a force on the inside of the belt to counteract the force of the plant stem. The block may be made of a slick plastic.

The first and second belt assemblies define a nip extending therebetween for gripping and pulling stems. As used herein, the term "nip" encompasses contact between the belt assembles and/or a small gap therebetween. The existence of a small gap may reduce friction and belt wear, thereby increasing the usable lifetime of the belt. In some embodiments, the belt system is spring loaded and self-adjusts to the size of the stem provided to the nip. The first belt assembly, the second belt assembly, or both belt assemblies may be spring loaded. The spring or springs may be biased for compression or expansion. In particular embodiments, the spring loading is oriented in a top to bottom (i.e. vertical) orientation. In some embodiments, the spring or springs are vertically oriented and connected to a lower or second belt assembly. In an expanded condition, the spring or springs push the lower or second belt assembly upwards to define a narrower nip (i.e. smaller nip distance). In a compressed condition, the lower, second belt assembly may be pulled down to define a larger nip distance and facilitate removal of jammed plant matter. The nip is aligned with one or more cutting apertures. In some embodiments, the cutting apertures are sharpened to facilitate cutting. In other embodiments, the cutting apertures are blunt to facilitate a more shredding separation process. The cutting apertures may be unitary with the housing or may be provided in a separate component. For example, a panel comprising a plurality of different sized cutting apertures may be detachably associated with the housing. Screws and other types of fasteners may be used to connect the cutting aperture panel to the housing. The cutting aperture(s) are generally aligned with the nip.

The use of belts instead of conventional larger rollers may increase the contact area, reduce slipping, and reduce the required stem engagement length, thereby reducing preparation work and the number of operators required to operate the destemming device.

The first and second belt assemblies may include the same number of rollers or different numbers of rollers. The gripping belts used in the assemblies may be the same or different. The rollers closest to the cutting apertures may be located at the same or substantially the same distance from the apertures. In other embodiments, the feed-facing roller of one of the belt assemblies may be located slightly closer to the feed than the feed-facing roller of the other of the belt assemblies. In particular embodiments, both belts are located very close to the cutting dies/cutting apertures and are aligned. The first belt assembly may be rigidly mounted (in a non-floating relationship) to the housing and the second belt assembly may be floating. The term "floating" means that the second belt assembly is not in a fixed location relative to the housing. For example, the connection between the second belt assembly and the housing may include a spring. The spring permits the distance between the first belt assembly and the second belt assembly to change, thereby increasing or decreasing the distance between the belts at the nip.

The belts may be timing belts. Timing belts are endless belts with teeth for engaging two or more sprockets associated with different components. In other embodiments, the inner surface of the belt is smooth. Timing belts may be capable of handling more torque without having to put so much pressure on the bearings. This may reduce the horsepower requirement, load on the bearings, and tracking issues.

The outer surface of the belt may be smooth or textured (e.g., to increase surface friction). Providing a textured surface may enhance the gripping ability of the belt, facilitate removal of moisture, and/or reduce buildup of plant material on the belt.

The outer surface of the rollers may be complementary in shape to the inner surface of the belt. For example, the inner surface of the belt and the outer surface of the rollers may both be smooth. In other embodiments, the inner surface of the belt includes a plurality of teeth which are complementary to a plurality of grooves in the inner surfaces of the rollers. In some embodiments, only the roller associated with the drive pulley includes grooves for receiving teeth of the belt.

In some embodiments, the rollers independently have lengths in the range of about 4" to about 12 inches, including from about 6 inches to about 10 inches, from about 6.5 inches to about 8 inches, and about 7.15 inches.

In some embodiments, the rollers independently have diameters in the range of about 0.5 inches to about 2.5 inches, including from about 1 inches to about 1.5 inches, and about 1.25 inches.

In some embodiments, the belt assembly (upper and/or lower) includes four rollers and the distances between adjacent rollers are: about 1 inches to about 2.5 inches, including about 1.5 inches and about 2 inches, and about 1.75 inches between the first and second rollers; about 1 inches to about 2 inches, including from about 1.25 inches to about 1.75 inches, and about 1.5 inches between the second and third rollers; and about 2 inches to about 3.5 inches, including from about 2.5 inches to about 3 inches, and about 2.75 inches between the third and fourth rollers. In some embodiments, the distances between rollers are the minimum distances needed to fit components such as bearings, cross members, etc. The sizes/dimensions may also be selected to facilitate changing the belt without complete disassembly of the roller system.

Suitable roller materials possess corrosion resistance. Non-limiting examples of suitable roller materials include anodized aluminum, rubber, stainless steel, and plastic.

One or more support bars may also extend between the rails between adjacent rollers. The support bar(s) may have lengths in the range of about 6 inches to about 12 inches, including from about 8 inches to about 10 inches, and about 9 inches. The support bar(s) may have heights in the range of about 0.25 inches to about 2 inches, including about 0.5 inches to about 1 inches, and about 0.75 inches. The support bar(s) may have thicknesses in the range of about 0.1 inches to about 0.5 inches, including about 0.25 inches. Using support bars may enhance the removability of the belt assemblies/cartridges. When rollers are used throughout the length of the belt assemblies, cleaning and belt removal may be more difficult and time-consuming.

Locating the support bar(s) further from the middle of the rails would make the assembly more rigid but would make removal of the belt more difficult (i.e., require disassembly of the frame). When the support bar(s) are located away from the ends of the rails, the belt can slip over the frame without removing the back rollers or any of the bearings. The front roller is still removed to change the belt but pulls out easily when tension is removed from the belt. Put another way, the belt tension can be what holds the front roller in place.

The belts may be made of rubber, such as natural rubber or a synthetic rubber. Non-limiting examples of synthetic rubbers include isoprene rubber, butadiene rubber, chloroprene rubber, (optionally halogenated) butyl rubber, styrenebutadiene rubber, (optionally hydrogenated) nitrile rubber, ethylene propylene rubber, ethylene propylene diene rubber, epichlorohydrin rubber, polyacrylic rubber, fluorosilicone rubber, fluoroelastomers, perfluoroelastomers, polyether block amides, chlorosulfonated polyethylene, and ethylene-vinyl acetate rubber.

The rubber is optionally reinforced with one of more fillers. Non-limiting examples of fillers include fibers such as aramid fibers, carbon fibers, and glass fibers.

In some embodiments, a removable support member can be added to the back bearing mount to prevent frame flexing. The removable support member may be cylindrical and may have a diameter in the range of about 0.25 inches to about 0.75 inches, including about 0.5 inches.

The belt system may be powered by a motor or manually (e.g., with a hand crank). Power may be provided to the motor directly or via a control unit. In some embodiments, the control unit includes an on/off switch or button, an emergency stop switch or button, and a dial or other variable input for controlling the frequency of the AC power that is sent to the motor. This in turn controls the speed. If a brush DC motor was used, the voltage could be varied to control the speed. This method is becoming obsolete as AC frequency drives as described above are becoming more available. Technically the horsepower is reduced, but that is a side effect of the reduced speed, not the cause of it. In non-limiting embodiments, the device may convert 110 volt wall power into 230 volt 3-phase power to properly run a 3-phase motor at a very controllable speed. The control unit may be located on the front of the destemming device. It is also possible that the control unit user interface is a touchscreen. Belt speed adjustments may be helpful for slowing the machine down for bucking dry plants.

The motor may be operatively connected to the belt system via a belt drive. The belt drive may include a drive pulley associated with the motor, a driven pulley associated with at least one of the belt assemblies, and a belt (e.g., a timing belt) extending around the drive and driven pulleys. In some embodiments, the driven pulley is connected to a single roller of one of the upper and lower belt assemblies.

It is expressly contemplated that the power may be provided from a renewable energy source. In some embodiments, the renewable energy source is solar power. In other embodiments, the renewable energy source is wind power.

The destemming device may further include a chain drive. The chain drive may include a first sprocket associated with a roller of the first belt assembly, a second sprocket associated with a roller of the second belt assembly, and a chain extending around the first and second sprockets. As an alternative to a chain drive, a 2-sided timing belt may be used. The 2-sided timing belt may reduce noise and the need for lubrication. A chain may be suitable for handling a higher torque for a given size of the drive.

In some embodiments, the driven pulley and the first sprocket are associated with the same roller. In other embodiments, the driven pulley and the second sprocket are associated with the same roller. In further embodiments, the driven pulley is associated with a roller other than the rollers associated with the first and second sprockets.

The belt drive and the chain drive may be located on opposite sides of the destemming device. In other embodiments, the belt drive and the chain drive are located on the same side of the destemming device.

It is also possible to replace the belt drive with a chain drive and/or to replace the chain drive with a belt drive. For example, both drives may be chain drives, both drives may be belt drives, or the drive associated with the motor may be a chain drive and the opposite drive may be a belt drive.

It is also possible that only one drive is included. It is also possible that other multiple drives may be included.

A slide or other receptacle may be located beneath the cutting apertures, for receiving the non-stem plant matter. The slide or other receptacle may be secured to the housing via one or more screws or other fasteners.

The housing may be associated with a base either directly or indirectly. In the embodiments depicted in the drawings, the housing is associated with the base through four square cross-section legs. However, it is also contemplated that different numbers (e.g., 1, 2, 3, 5, 6, etc.) or cross-section shapes (e.g., circular, triangular, rectangular, other polygonal, irregular, etc.) of legs may be used.

It is also possible to omit the legs and mount the machine (e.g., to a 3-point hitch or plate mount like a skid steer). The device could run off the power take-off on a tractor or a "Power Beyond Hydraulic System" on a skid steer or other hydraulically powered machine. The device may include a standalone or incorporated hydraulic power unit.

The housing and legs may be constructed as a unitary structure or be distinct components. In some embodiments, the housing is detachably associated with the legs via one or more screws or other fasteners. In some embodiments, the housing is configured to be dropped onto pins and held in place relative to the legs with toggle latches or other fastener means.

The legs and base may also form a unitary structure or be distinct components.

The use of distinct components may facilitate the transportation, loading, unloading, etc. of the destemming device. For example, the smaller parts may be easier/cheaper to ship and/or load into the trunk of a car.

The housing, legs, and base may be made of the same or different materials. Non-limiting examples of suitable materials include powdercoated steel, aluminum, and stainless steel. Aluminum and magnesium castings are also contemplated. Injection molded plastic frames are also contemplated.

Although the base depicted in the drawings is rectangular, other shapes are also contemplated. In some embodiments, the base is circular, triangular, pentagonal, hexagonal, etc.

A plurality (e.g., 4) of optionally lockable wheels may be associated with the bottom of the base to facilitate moving the destemming device.

The device can also be easily transported over rough terrain with a 2-wheel dolly or other device.

The wheels may be standard or large all terrain casters and may be bolted on. In some embodiments, the device includes a recess for retaining a power generator. In non-limiting embodiments, the base is continuous and may act as a shelf for receiving the generator.

The destemming devices of the present disclosure advantageously reduce the length of stem that must be inserted into the machine. For example, the amount of stem material that must be inserted into one of the cutting apertures and grasped by the belt system may be as small as about 1 inches, about 1.5 inches, about 2 inches, about 2.5 inches, or about 3 inches. In contrast, known destemming devices which utilize a pair of large rollers may require 5 inches of stem or more to be inserted before the plant material is grasped by the rollers. The use of a belt drive system with small rollers instead of known beltless devices with large round rollers may reduce the manual labor required prior to using the destemming device.

The belt system may be continuously adjustable, meaning it will grab any size stem put in any size cutting aperture. In fact, the belt system may be configured such that it continuously adjusts to the size of the stem as it changes during the feed process by adjusting the gap/distance between the upper and lower belt assemblies which define the nip. This effect can be achieved by at least one spring-loaded connection between the housing and at least one of the belt assemblies. For example, the lower belt assembly may be connected to the housing via a spring connection, thereby allowing the belt system to adjust to the size of the stem. Non-limiting examples of spring connectors include metal springs, air springs, rubber tension devices, and elastomeric mounts.

The longer belt also facilitates a longer contact zone instead of the smaller point contacts for the large conventional rollers. In some embodiments, the belt system is configured to grip the plant over a length of at least 2 inches, at least 3 inches, at least 4 inches, or at least 5 inches. The larger gripping length facilitates an increase in pulling power.

The destemming devices of the present disclosure may also enable simple dejamming. Destemming devices may jam when a stem does not make it all the way through a die. The destemming devices of the present disclosure may include a dejamming system which increases the gap between the upper and lower belt assemblies to release the belt system's grip on the stem and allow removal of the jammed plant matter, sometimes without requiring stopping the motor. Other machines require the operator to stop the machine and reverse pull the stem out of the machine.

The dejamming system may include a foot pedal. The foot pedal may be located on the same side of the destemming device as the cutting apertures. The foot pedal may be centrally located or may be offset to the left side or right side for ease of accessibility to the right foot or left foot, respectively, of the operator. In some embodiments, the foot pedal may be attached to a first lever. The first lever may extend beneath a base of the destemming device with a generally horizontal orientation. A second lever may also be included. The second lever may be attached to the first lever at a point along the length of the first lever and beneath the housing. The second lever may be perpendicular or substantially perpendicular to the first lever with a generally vertical orientation. The end of the second lever opposite the connection to the first lever may be connected to the belt system. For example, the second lever may be connected to the lower belt assembly such that pressing the foot pedal leads to the second lever pulling the lower belt assembly away from the upper belt assembly, thereby increasing the nip and releasing the jammed plant matter. The connection may be via a horizontally oriented bar connected to the second lever.

The destemming devices of the present disclosure may be cleaned and/or serviced for maintenance relatively quickly. For example, the belt system may be disassembled for cleaning and/or replacement of either or both of the belt assemblies in a couple minutes. Other machines may require the machine to be cleaned in its assembled state, thereby rendering the machine unusable during the maintenance period. The destemming devices of the present disclosure may utilize easily replaceable upper and lower belt assembly cartridges. The metal component(s) of the belt assemblies may be made of stainless steel or other corrosion-resistant material (e.g., another corrosion-resistant alloy or metal, plastic, etc.).

In some embodiments, the upper belt assembly includes one or more catches including open-ended openings through which the upper belt assembly can be secured to the housing (e.g., via screws). In a fixed state (i.e., when the screws or other fasteners are tightened), the upper belt assembly is securely fixed to the housing. Upon loosening the screws or other fasteners, the upper belt assembly can be easily removed by pulling the upper belt assembly through the rear of the device since the open ends of the opening will allow the screws or other fasteners to pass therethrough.

The lower belt assembly is optionally secured to the housing via one or more easily removable hairpins.

It is also possible that the upper belt assembly is secured to the housing via one or more easily removable hairpins and/or the lower belt assembly is secured to the housing via a catch.

Prior to removing the upper and lower belt assemblies/cartridges, the chain of the chain drive and the belt of the belt drive should be removed.

The destemming devices of the present disclosure may include one or more removable covers for the housing. In some embodiments, the one or more removable covers include a top cover and two side covers. The two side covers may be detachably associated with the housing via magnets (e.g., four magnets for each side cover—one associated with each corner of the side cover). The magnets may be located on the side cover, on the housing, or on both the side cover and the housing. In some embodiments, the rear of the housing is uncovered to allow the belt system to eject stems from the back of the device.

Another potential benefit of using the belt system is that less plant residue may adhere to the belt compared to a large roller/wheel system. Without wishing to be bound by theory, it is believed that the transition from the straight contact area in the nip to a round shape at the rear of the belt causes waste plant material (not the desired product) to fall off the belt. This reduces the necessary clean up and also helps maintain the gripping ability of the device because the stem fed to the device is contacted by the belt itself, not plant residue.

Figure 2:
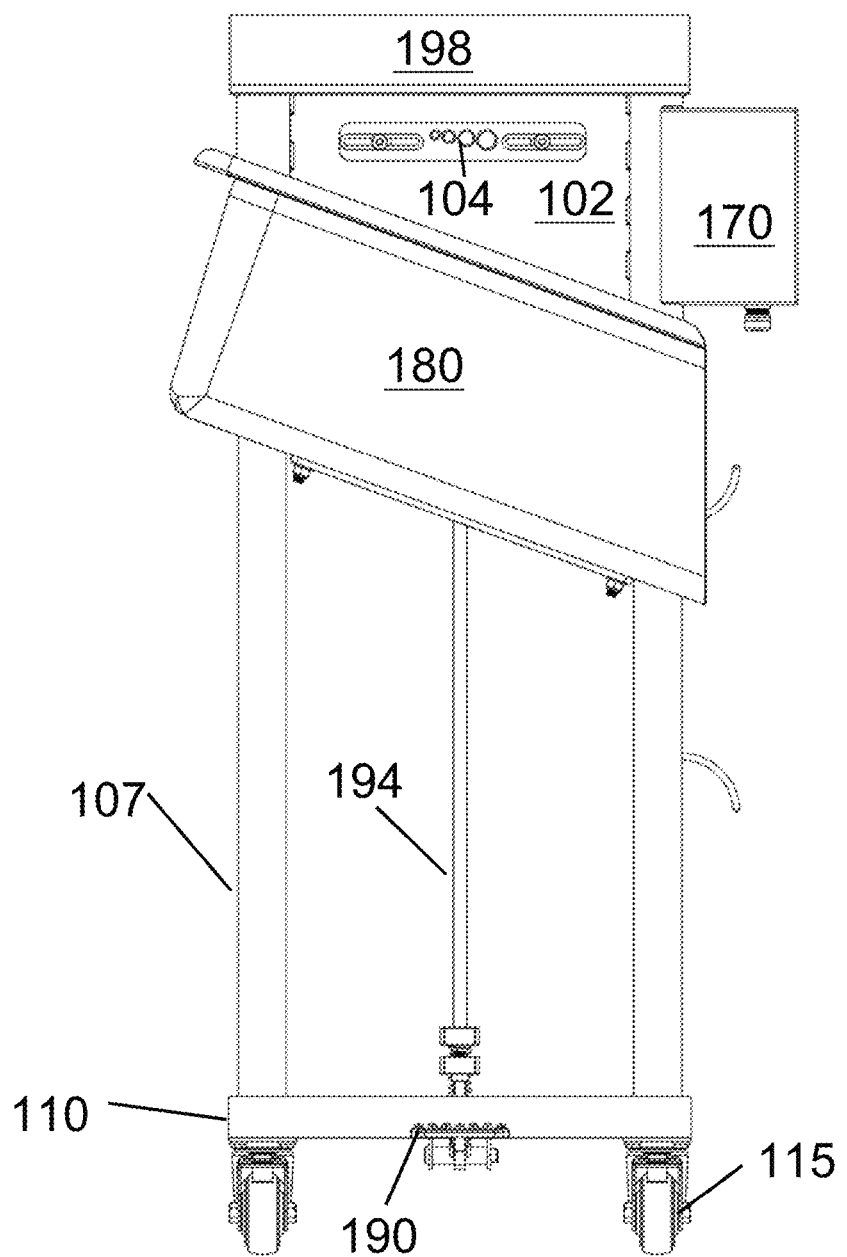
FIG. 2 is a front view of the destemming device of FIG. 1.
Figure 3:
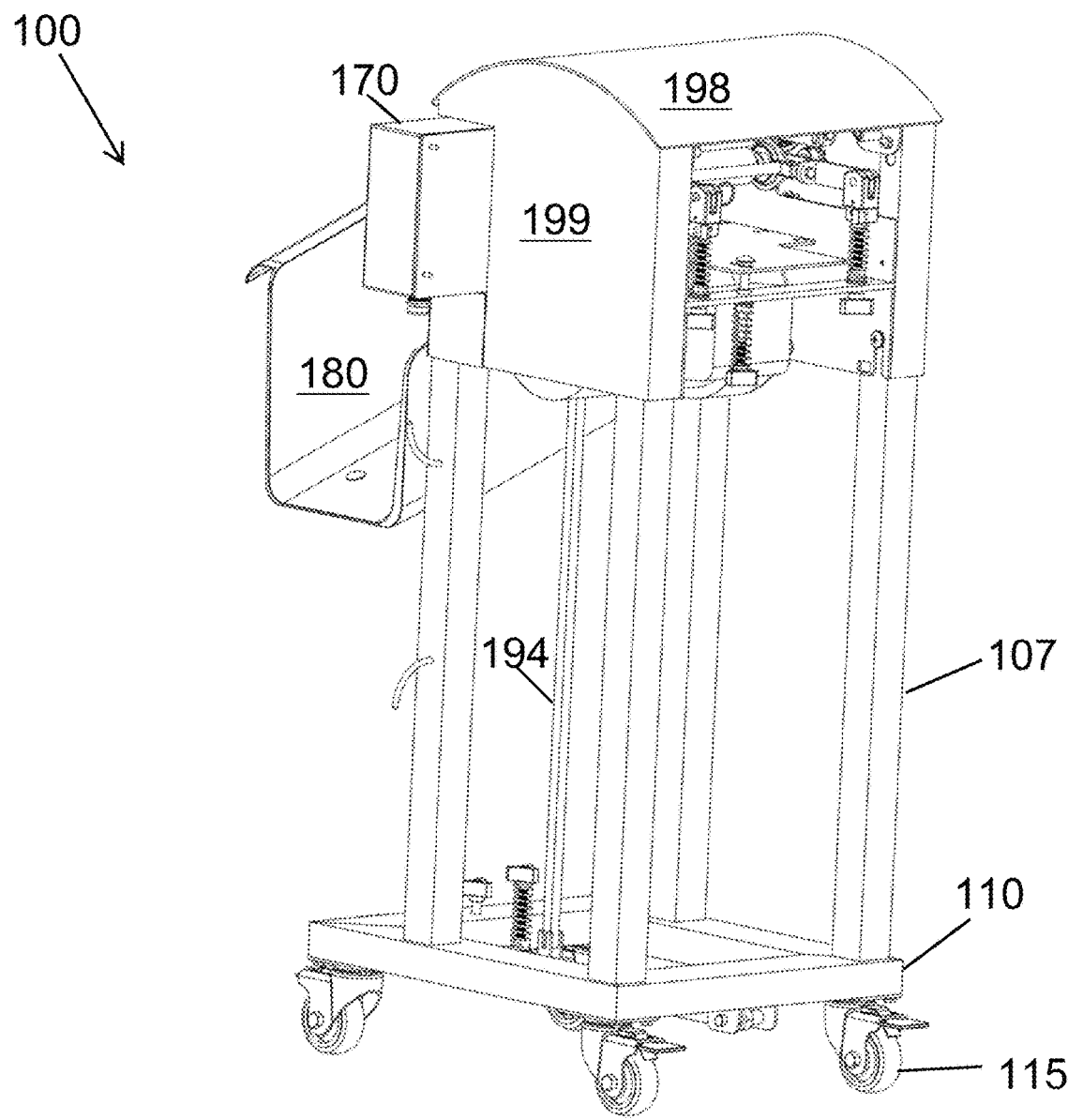
FIG. 3 is a rear perspective view of the destemming device of FIG. 1.

FIGS. 1-3 are drawings of the exterior of a destemming device 100 in accordance with some embodiments of the present disclosure. Referring to all three figures together, the device 100 includes a housing 102 secured to a base 110 via legs 107. The housing 102 includes cutting apertures 104 through which plant matter to be processed can be fed. The housing 102 further includes a top cover 198 and one or more side covers 199. One or more of these covers may be detachably associated with the housing 102 to permit observation and/or maintenance of the internals. The device 100 may be equipped with wheels 115 attached to the base 110 to facilitate movement. Below the cutting apertures 104, a slide 180 may be attached to catch falling plant matter and transfer it to a container. A control unit 170 may be mounted on the device, optionally on the housing. The device 100 further includes a jam removal system including a foot pedal 190, a first lever 192, and a second lever 194. When the foot pedal 190 is pressed, the first lever 192 pulls down the second lever 194 which is connected to at least one element within the housing and makes it easier to pull jammed plant matter out of the device. The side of the housing on which the cutting apertures are located can be considered the front side of the housing. As seen in FIG. 3, in some embodiments, the rear side of the housing is exposed, which permits waste material to exit the device.

Figure 4:
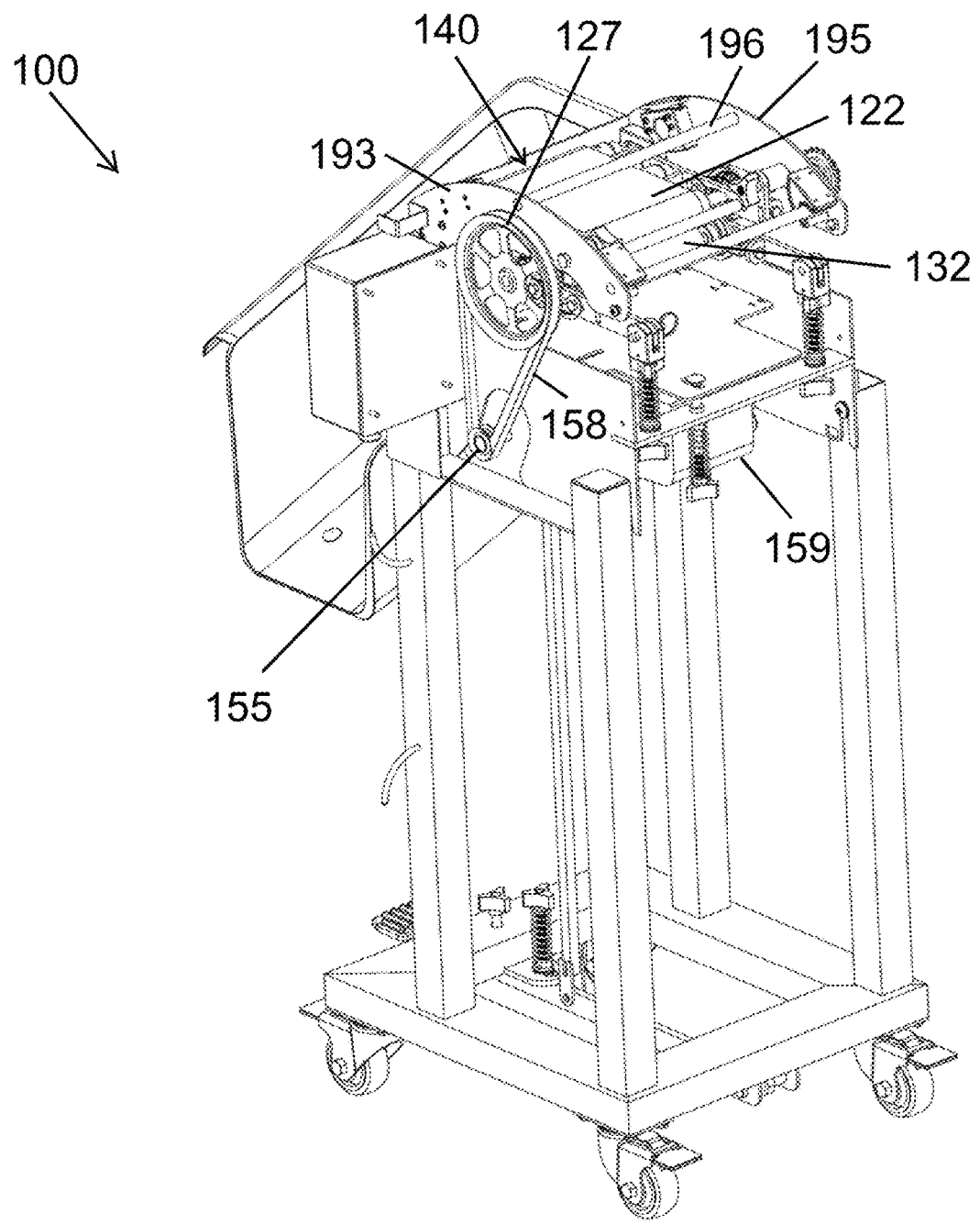
FIG. 4 is a rear perspective view of the destemming device of FIG. 1 with the covers removed and exposing the interior.
Figure 5:
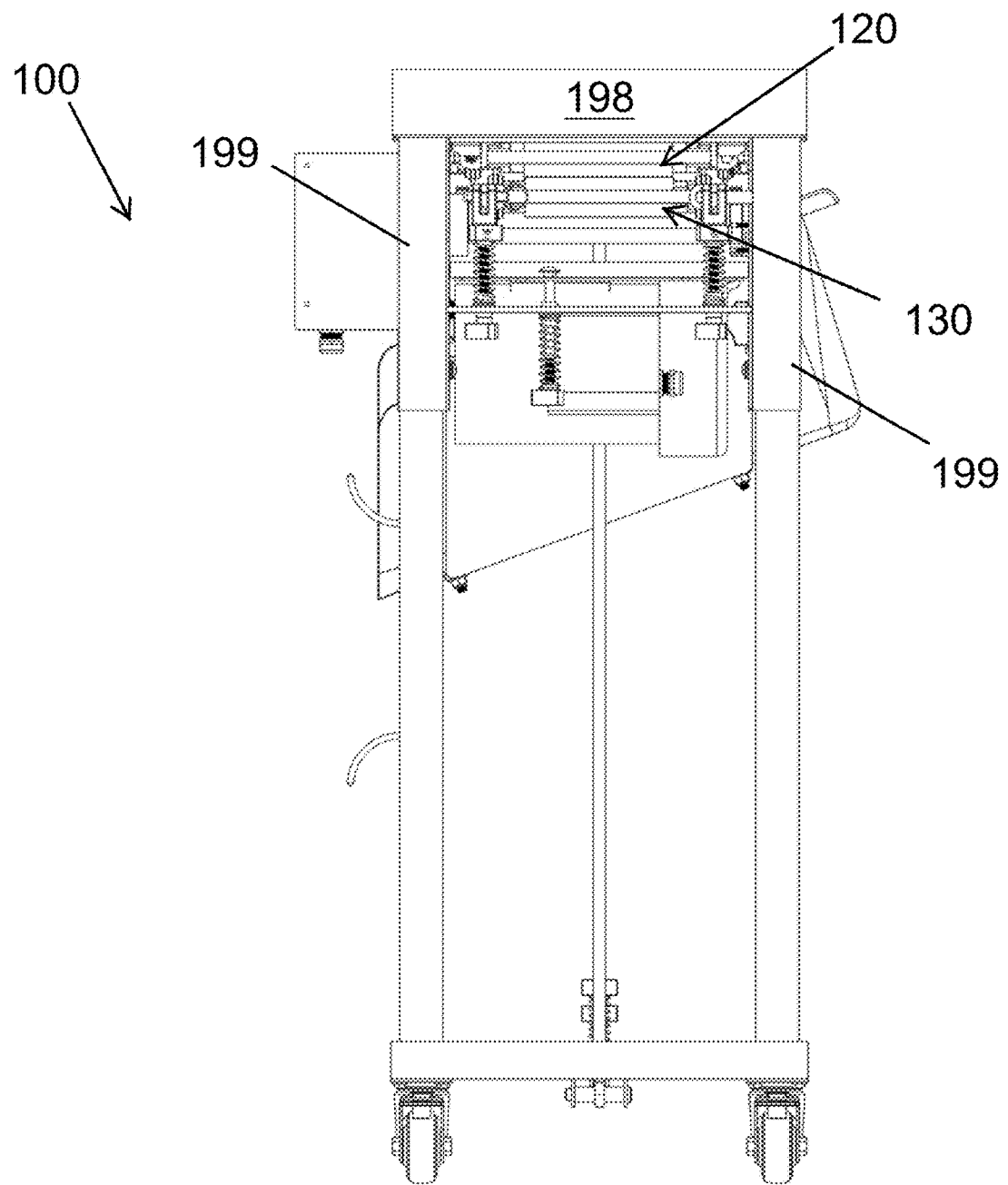
FIG. 5 is a rear view of the destemming device of FIG. 1.

FIGS. 4-7 provide some interior views of the device. Referring to FIG. 4 and FIG. 5 together, the housing contains a belt system that includes a first (or upper) belt assembly 120 and a second (or lower) belt assembly 130. The first belt assembly 120 includes a first gripper belt 122, and the second belt assembly 130 includes a second gripper belt 132. Together, the first belt 122 and the second belt 132 define a nip 140 at a forward location within the housing adjacent to the cutting apertures. Also visible in FIG. 4 is a driven pulley 127 which is operatively connected to a drive pulley 155 by a belt 158. The drive pulley 155 is connected to motor 159, which may be mounted beneath the housing or contained within the housing. Also visible is a support structure including a first support wall 193 on a first side, a second support wall 195 on a second side spaced apart from the first side, and a support bar 196 extending therebetween. As will be discussed further herein, the support structure supports the various components of the device.

In some embodiments, a drive pulley with a tapered shaft that relies on friction for grip can be used. Alternatively, a toothed timing belt with a positive drive may reduce bearing load and overall friction while improving performance. In some embodiments, only the drive pulley is toothed.

Figure 6:
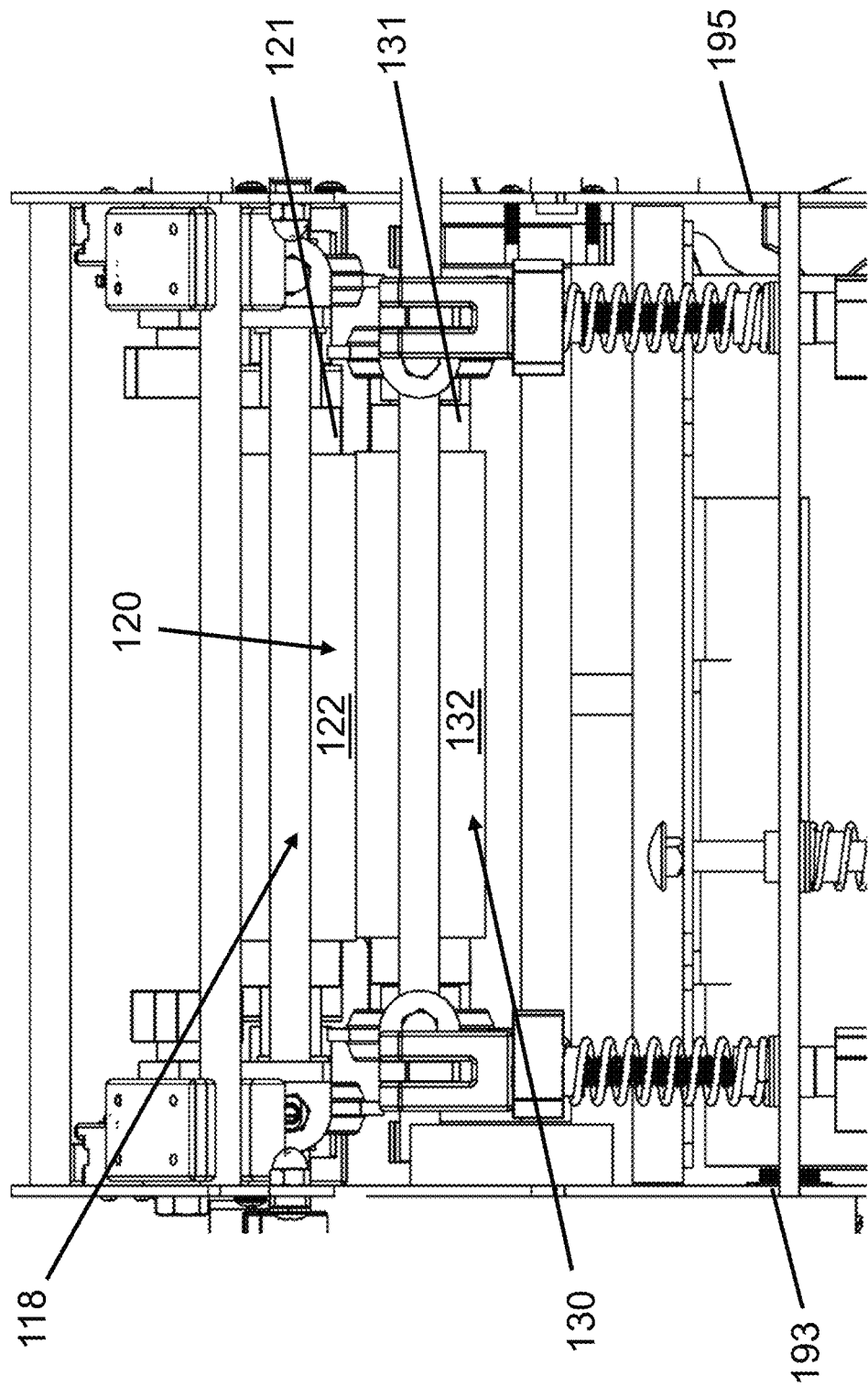
FIG. 6 is a zoomed-in view illustrating the belt system of the destemming device.
Figure 7:
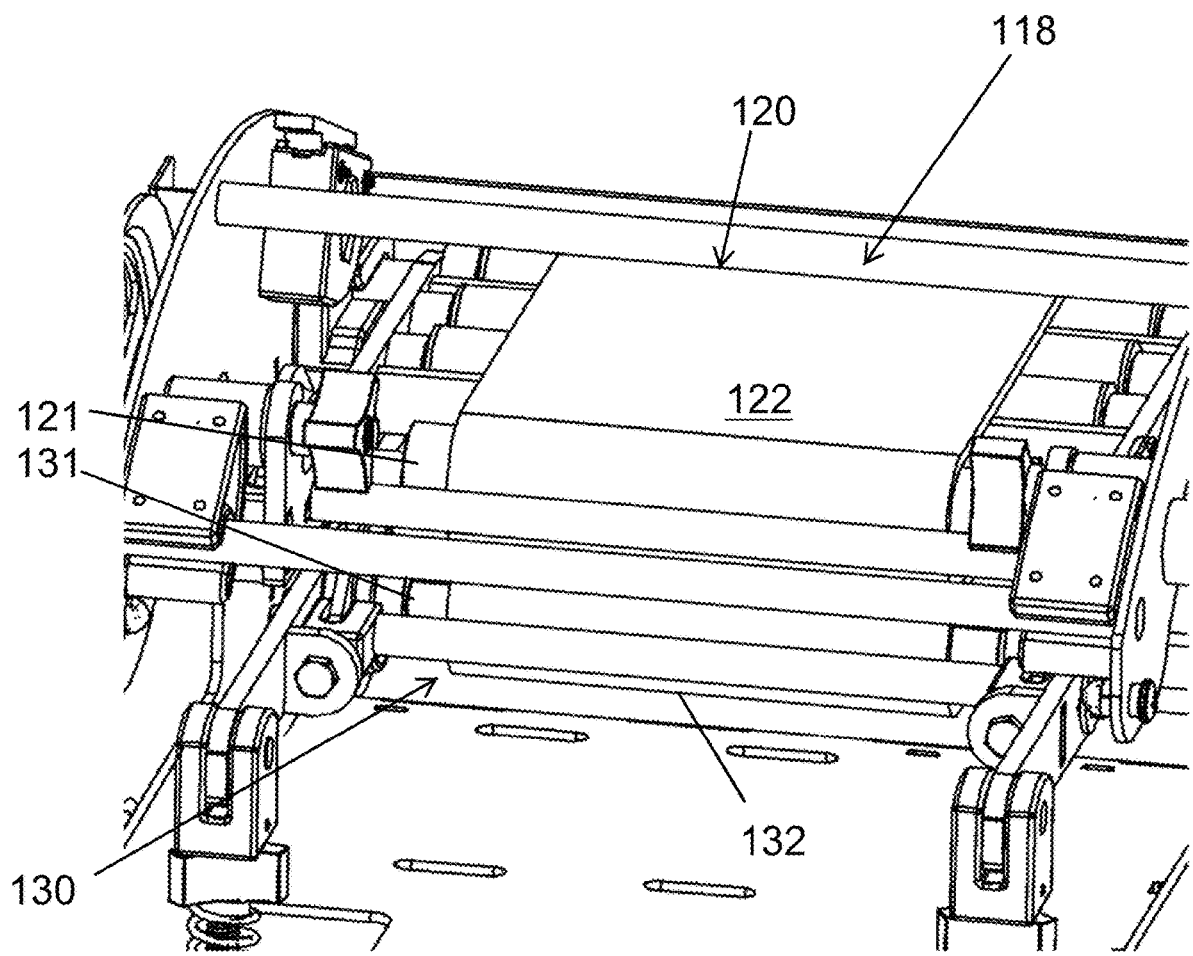
FIG. 7 is an upper perspective view of the belt system of the destemming device of FIG. 1.

FIG. 6 is a rear view, and FIG. 7 is a rear perspective view. The belt system 118 comprises the first belt assembly 120 and the second belt assembly 130. The first belt assembly 120 is generally located above the second belt assembly 130. The two gripper belts 122, 132 are visible. Also visible are first rollers 121 which are part of the first belt assembly, and second rollers 131 which are part of the second belt assembly. The belt system 118 is located between the two support walls 193, 195.

Figure 8:
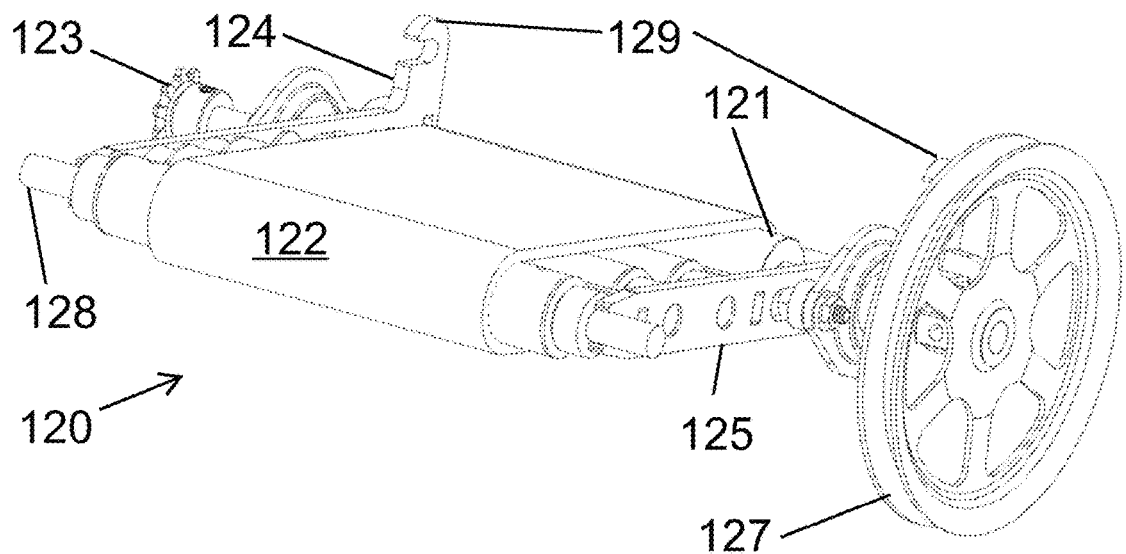
FIG. 8 is a first side perspective view of a first belt assembly in accordance with some embodiments of the present disclosure.
Figure 9:
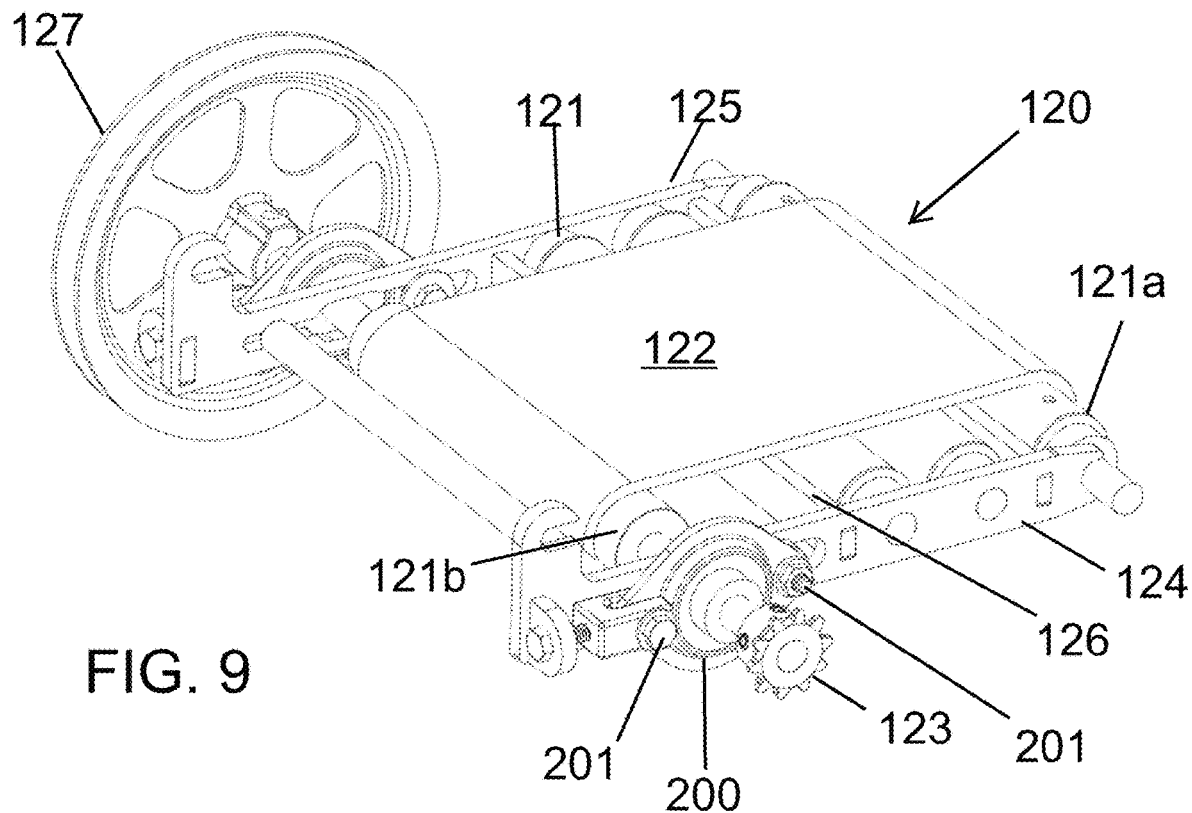
FIG. 9 is a second side perspective view of the belt assembly of FIG. 8.

FIG. 8 and FIG. 9 illustrate an embodiment of a first belt assembly 120 separated from the housing, and provide views from two different sides. The first belt assembly 120 includes first rollers 121 (including front roller 121a and rear roller 121b), a first gripper belt 122, a first sprocket 123, a first rail 124, a second rail 125, one or more first support bars 126, and possibly a driven pulley 127. The first rail 124 and the second rail 125 define opposite spaced-apart sides of the first belt assembly. The first support bars 126 extend between the first rail 124 and the second rail 125, creating a frame on which the rollers can rotate. The first rollers 121 and the first gripper belt 122 are located between the first rail 124 and the second rail 125, with the first gripper belt 122 traveling around the first rollers 121. A plurality of first rollers may be present. Each first roller 121 rotates around a shaft 128, which can extend beyond the rails, and may be complementary to one or more other elements within the housing which receive the one or more shaft to support the first belt assembly.

Each rail 124, 125 further includes catches 129 for securing the first belt assembly 120 to the housing 102. The catches 129 and the rails 124, 125 may be unitary or separate elements. The first sprocket 123 is connected to a shaft that extends outwards beyond one of the rails 124, 125. When present, the driven pulley 127 extends outwards beyond the other rail 125, 124 on the opposite side from the first sprocket. The first sprocket 123 and the driven pulley 127 are usually attached to the same shaft. Also visible here are mount plates 200 around the shaft of rear roller 121b on both sides. Each mount plate 200 is fixed in place on the rail 124, 125 using two bearing mount bolts 201.

Figure 10:
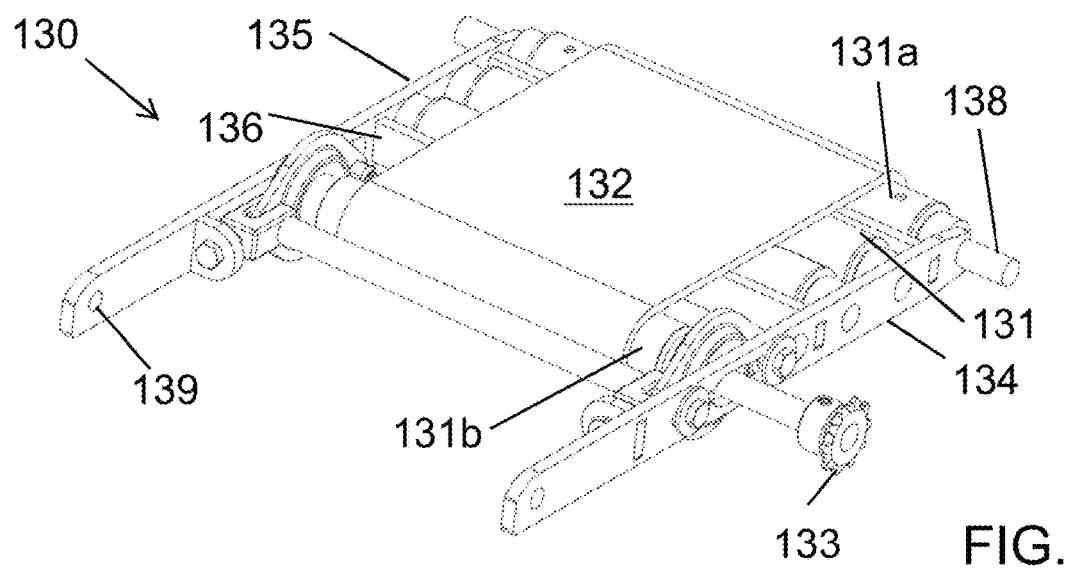
FIG. 10 is a first side perspective view of a second belt assembly in accordance with some embodiments of the present disclosure.
Figure 11:
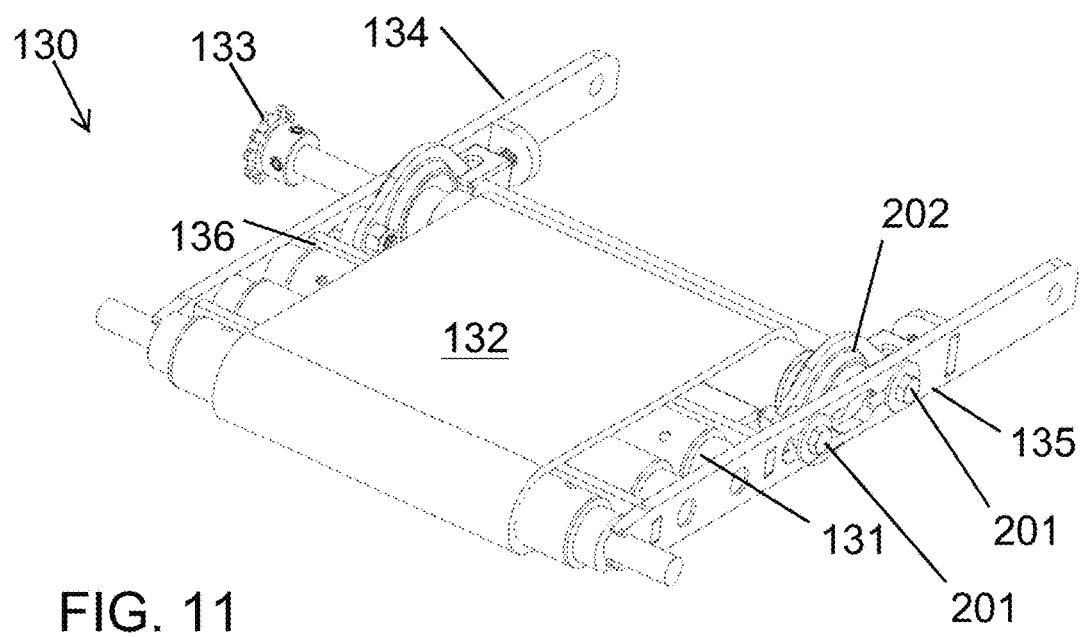
FIG. 11 is a second side perspective view of the belt assembly of FIG. 10.

FIG. 10 and FIG. 11 illustrate an embodiment of a second belt assembly separated from the housing, and provide views from two different sides.

The second belt assembly 130 includes second rollers 131 (including front roller 131a and rear roller 131b), a second gripper belt 132, a second sprocket 133, a first rail 134, a second rail 135, and one or more second support bars 136. The first rail 134 and the second rail 135 define opposite spaced-apart sides of the second belt assembly. The second support bars 136 extend between the first rail 134 and the second rail 135, creating a frame on which the rollers can rotate. The second rollers 131 and the second gripper belt 132 are located between the first rail 134 and the second rail 135, with the second gripper belt 132 traveling around the second rollers 131. A plurality of second rollers may be present. Each second roller 131 rotates around a shaft 138, which can extend beyond the rails, and may be complementary to one or more other elements within the housing which receive the one or more shafts to support the second belt assembly.

The rails of the second belt assembly may include apertures 139 or other elements complementary to one or more feature within the housing for securing the second belt assembly 130 within the housing, as will be described further herein. The second sprocket 133 is connected to a shaft that extends outwards beyond one of the rails 134, 135. Also visible here are mount plates 202 around the shaft of rear roller 131b on both sides. Each mount plate 202 is fixed in place on the rail 134, 135 using two bearing mount bolts 201.

It is noted that when comparing the mount plates 200, 202 in FIGS. 8-11, the mount plates 200 are illustrated in FIG. 8 and FIG. 9 as being on the exterior side of the rails 124, 125, while the mount plates 202 are illustrated in FIG. 10 and FIG. 11 as being on the interior side of the rails 134, 135. More generally, the mount plates can be on either side of the rail for either belt assembly.

Figure 12:
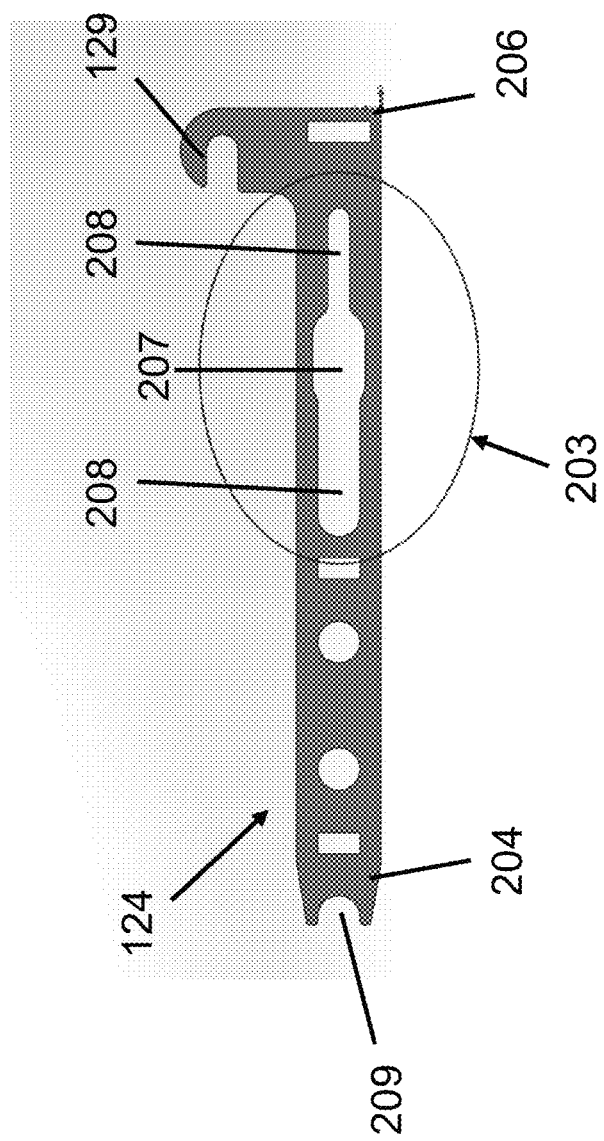
FIG. 12 is a side view of a rail used in a belt assembly in accordance with some embodiments of the present disclosure.

FIG. 12 is a side view of a rail (e.g., 124, 125, 134, 135) in accordance with some embodiments of the present disclosure. The rail includes an elongated cutout 203 along the axis between the front end 204 and the rear end 206 of the rail. The elongated cutout includes a central portion 207 and two side portions 208. The height of the two side portions is less than that of the central portion. The purpose of this elongated cutout is to permit easier belt replacement. Referring to FIG. 11, the service lifetime of the second gripper belt 132 is likely to be much shorter than the other components of the second belt assembly 130. The tension of the second gripper belt 132 is maintained by the distance between front roller 131a and rear roller 131b. Rear roller 131b is held in place by bolts 201, which engage the two side portions 208 of the elongated cutout.

Referring back to FIG. 12, when the four bearing mount bolts are removed, the shaft associated with rear roller 131b can slide within the central portion 207, releasing belt tension and permitting enough clearance for the gripper belt 132 to be slipped off over the frame. The front roller 131a is held in place in a semicircular groove 209 located at the front end of the rail 124, and can just fall out when the belt tension is released. Without the elongated cutout 203, several components (e.g. the driven pulley, sprocket, shaft, etc.) would have to be removed to facilitate belt removal. Alternatively, it is also contemplated that a two-piece frame that could come apart to create clearance for the gripper belts 122, 132 may be used. However, the cutout portion as shown in FIG. 12 allows for a one-piece frame to be used.

Figure 13:
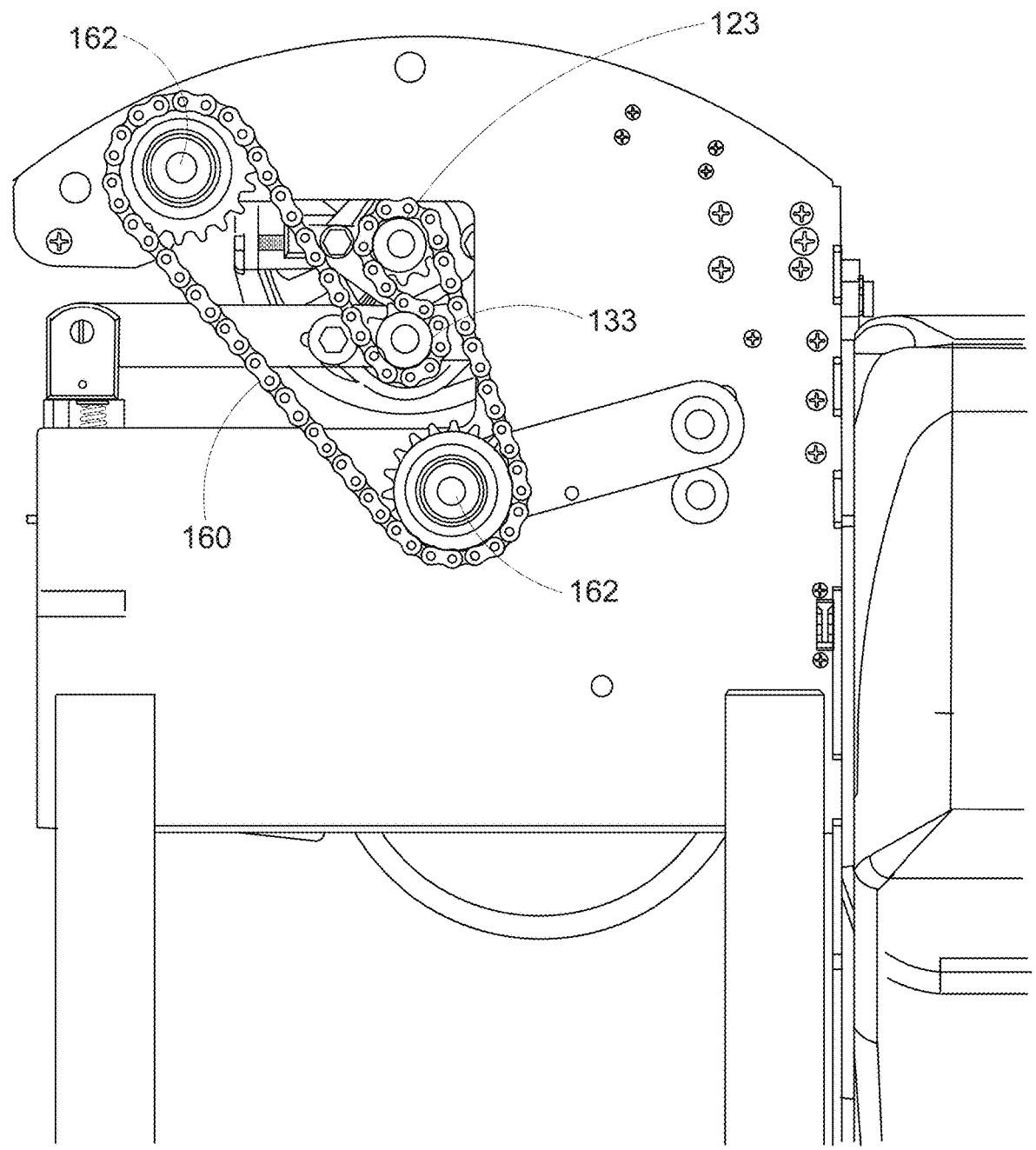
FIG. 13 is a side view of a chain and sprocket drive, illustrating how the two belt assemblies can be mechanically connected to rotate together.

Now, considering the first belt assembly 120 and the second belt assembly 130 together, the driven pulley 127 is connected to one of the belt assemblies 120, 130. As seen in FIG. 4, the driven pulley is rotated by the motor 159. Then, as seen in FIG. 13, the first sprocket 123 and the second sprocket 133 are connected together with a chain 160. This permits both belt assemblies to be driven by the motor, regardless of which belt assembly contains the driven pulley 127. If desired, the chain 160 may be connected to one or more additional idle sprockets 162, which can increase the contact of the chain with the first sprocket 123 and the second sprocket 133 (particularly the sprocket on the same shaft as the driven pulley 127), thereby reducing skipping under high load. Although a chain is used in some of the depicted embodiments, it is also possible to use a timing belt (e.g., a double-sided timing belt) instead. It is noted that the driven pulley is on the opposite side of the housing from the two sprockets 123, 133.

Figure 14:
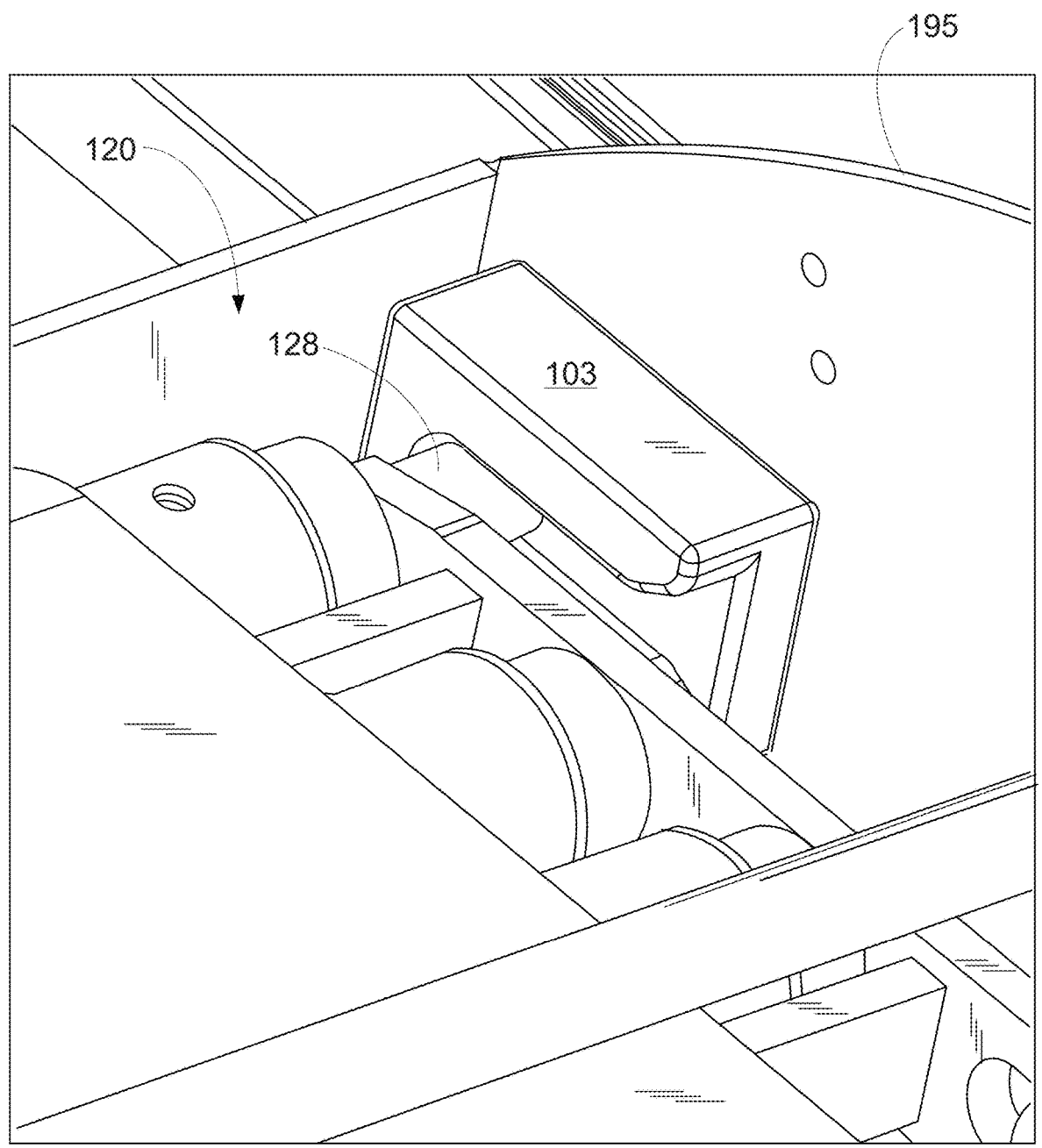
FIG. 14 illustrates one means for connecting the front end of the upper belt assembly and the housing.

FIG. 14 illustrates one example of a structure by which the front end of the first or upper belt assembly 120 is joined or connected to the housing. In particular, the shaft 128 slides into a groove within block 103 (e.g., an aluminum block) located on support wall 195.

Figure 15:
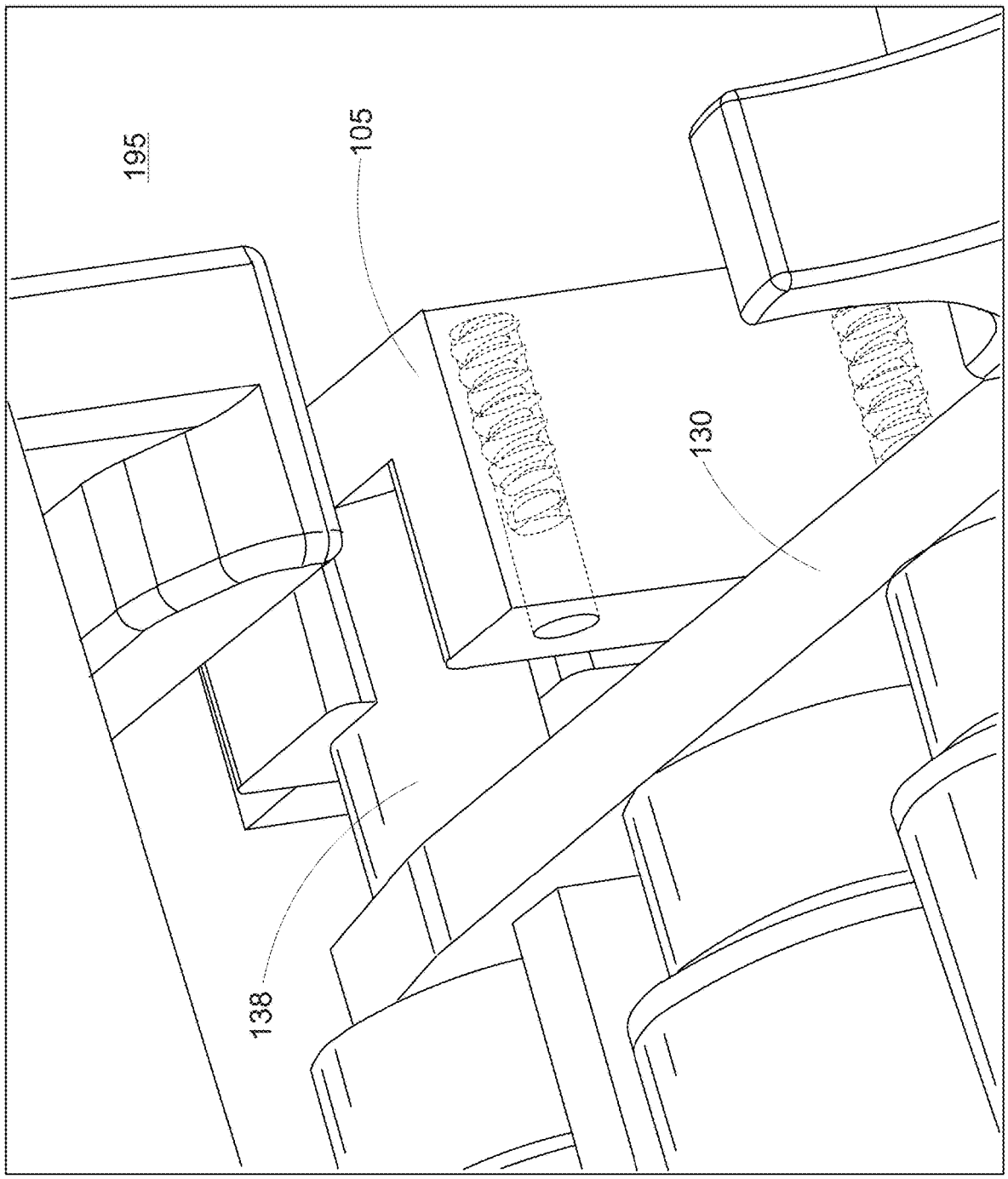
FIG. 15 illustrates one means for connecting the front end of the lower belt assembly and the housing.

FIG. 15 illustrates an example of a similar structure for joining or connecting the front end of the second or lower belt assembly 130 to the housing. In particular, a shaft 138 of the second belt assembly 130 drops into a notch of a guide block 105 (e.g., a plastic guide block) located on support wall 195.

Figure 16:
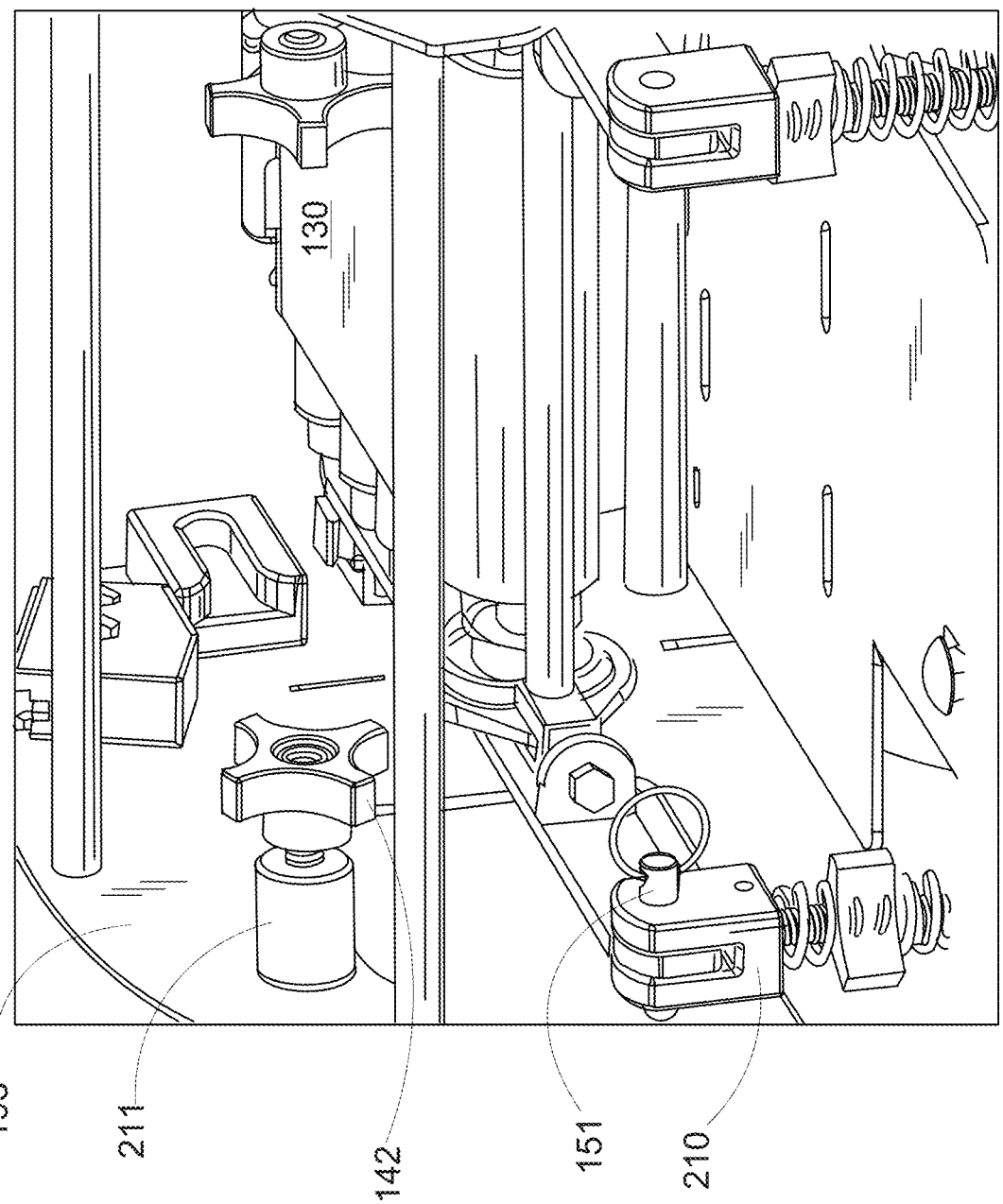
FIG. 16 illustrates one example of a connection between the rear end of the lower belt assembly and a spring system associated with the housing.

Referring now to both FIG. 16 and to FIG. 10, the back side of the second belt assembly 130 may be held in place by a quick release ball pin 151 which passes through aperture 139 in rail 134, 135 and through a U-shaped support 210 which can travel vertically. The U-shaped support may be used as part of a jam removal system to change the nip distance between the two belt assemblies.

Referring now to both FIG. 16 and to FIG. 9, a short bar 211 also extends from support wall 193 into the interior of the housing. A fastening element 142 (e.g. a knob) screws into the short bar 211. The catch 129 of the first belt assembly 120 engages this bar/knob assembly to support the rear end of the first belt assembly.

Figure 17:
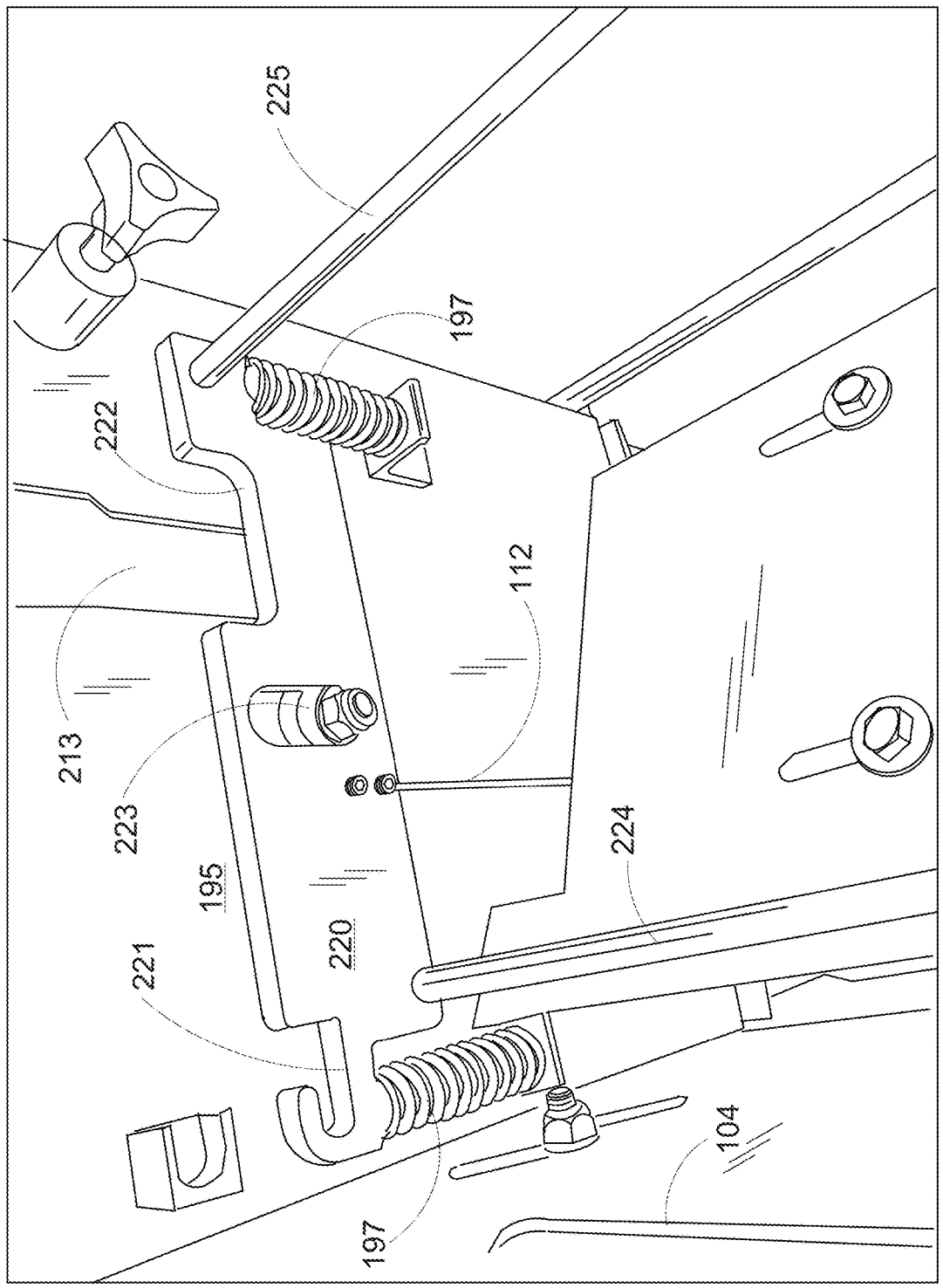
FIG. 17 is an image of one side of a carriage for receiving a lower belt assembly in accordance with some embodiments of the present disclosure, which can be used for removing jammed plant matter.

FIGS. 17-20 illustrate another embodiment for including a jam removal system. Referring first to FIG. 17, the system includes a carriage that includes two rails. A first rail 220 is shown mounted onto support wall 195. Cutting apertures 104 are also labeled for reference. A second rail is mounted on the opposite support wall as well (not visible). Two ledges extend from support wall 195 to support springs 197 which are oriented vertically and biased for extension (i.e. longer when no load applied). The rail 220 is supported by the springs 197, and has two downward-facing stems (not visible), one at each end to engage the springs. A front end of the rail includes an L-shaped notch 221 which is entered from an upper side of the rail. A horizontal cutout 222 in the upper side of the rail is also present, which is aligned with a vertical cutout 213 in the support wall 195. A central section of the rail includes a vertical cutout 223, which is used to guide the vertical travel of the rail and can also be used to keep the rail against the support wall. A front lower support bar 224 and a rear upper support bar 225 extend across to the second rail, forming the carriage. A cable 112 extends downwards from the rail 220. The same structure is repeated on the opposite support wall.

Figure 18:
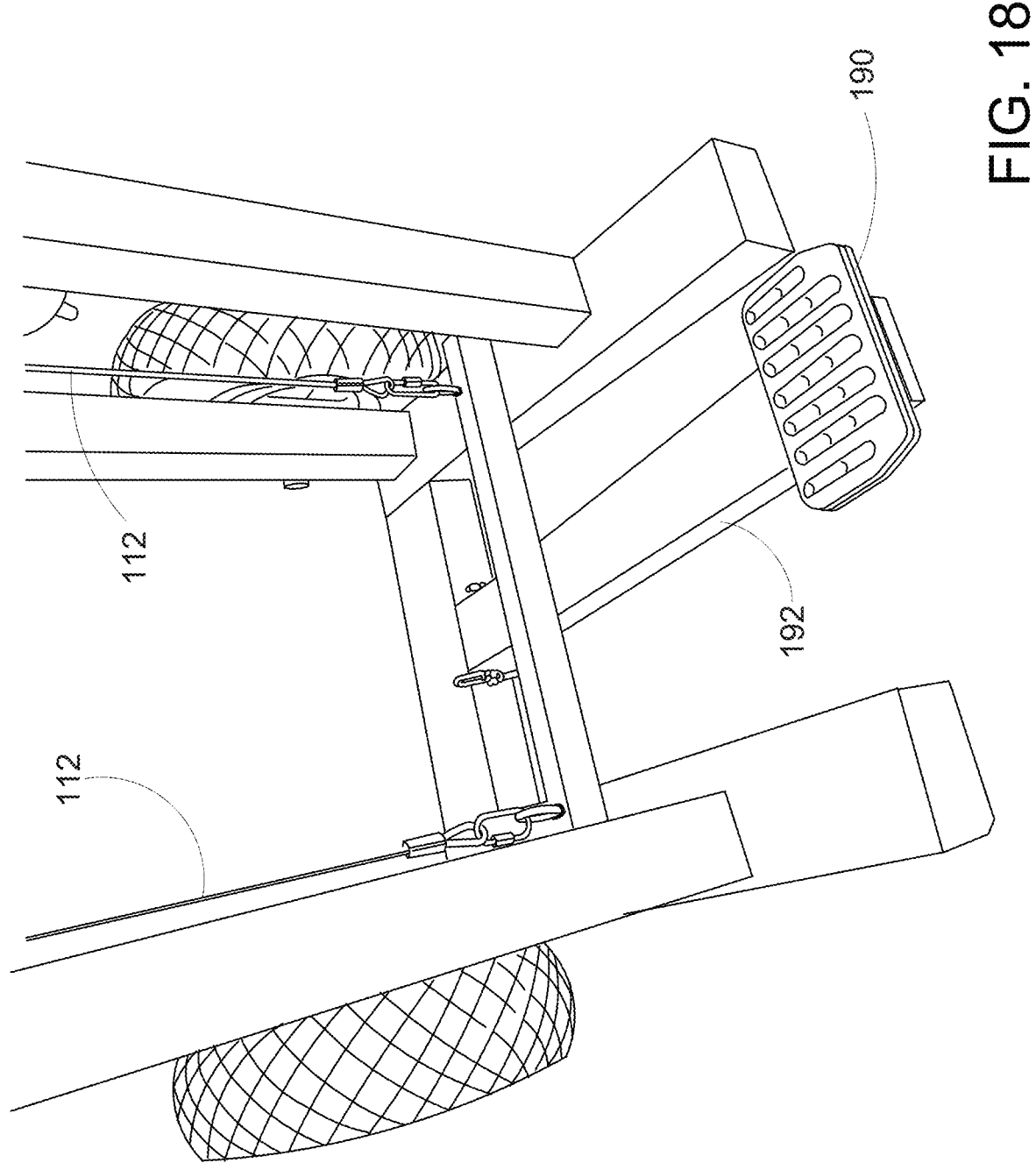
FIG. 18 is an image of a lower portion of the system for removing jammed plant matter.

Referring now to FIG. 18, the lower portion of the system for removing jams shows the other end of the two cables 112 attached to a t-shaped arm/lever 192 associated with the foot pedal 190. In use, when the foot pedal is depressed, the two cables 112 pull the rails 220 and the carriage downwards, such that the entire lower belt assembly is pulled down more or less uniformly from front to back. This increases the nip distance, permitting easier release of any jammed plant material. In some embodiments, the carriage can move downwards a distance of up to about 2 inches, including up to about 1 inch when the foot pedal is depressed.

Figure 19:
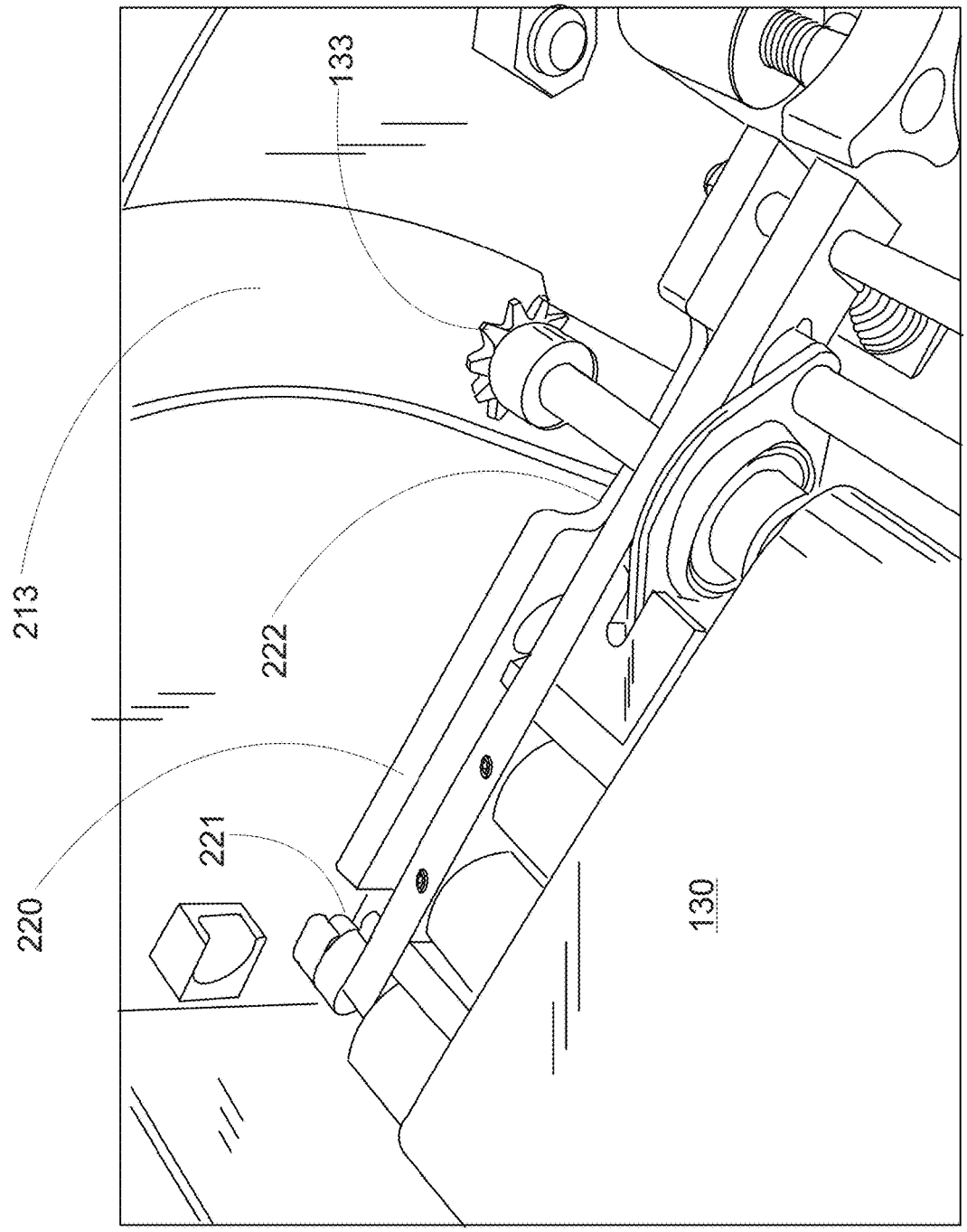
FIG. 19 is an image of a lower belt assembly cartridge locked in the carriage.

FIG. 19 shows one side of the second belt assembly 130 locked into the rail 220. As more easily seen here, the shaft holding the second sprocket 133 rests in the horizontal cutout 222 and extends through the vertical cutout 213 in the support wall. The front shaft of the second belt assembly sits in the notch 221. The rail 134 of the second belt assembly also engages the rear upper support bar 225.

Figure 20:
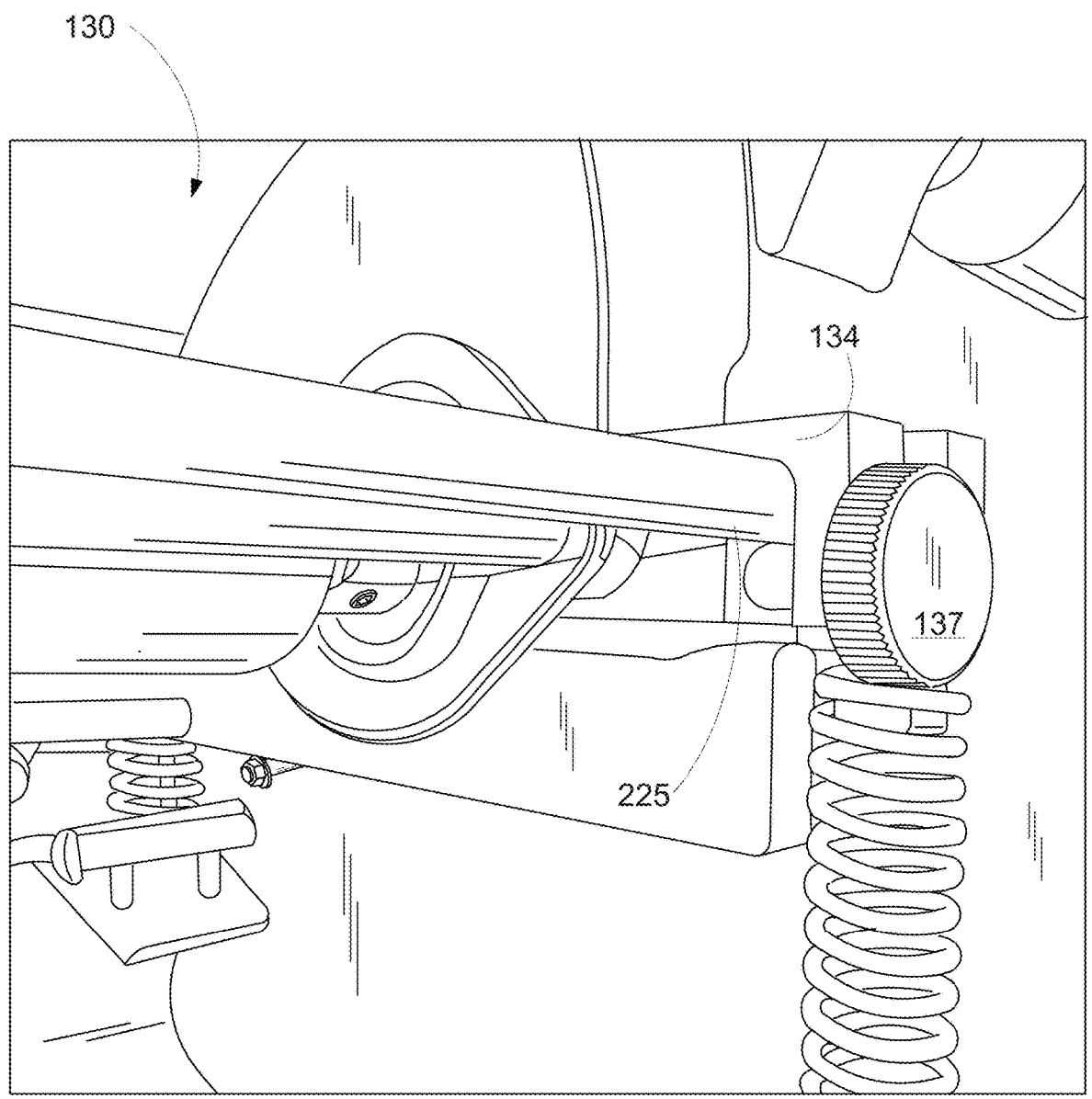
FIG. 20 is a rear image of a knob holding the lower belt assembly cartridge of FIG. 19 in place.

As seen in FIG. 20, the rail 134 of the second belt assembly also engages the rear upper support bar 225. A knob 137 holds the second belt assembly 130 in place around the rear upper support bar 225 and relative to the rail 220.

Figure 21:
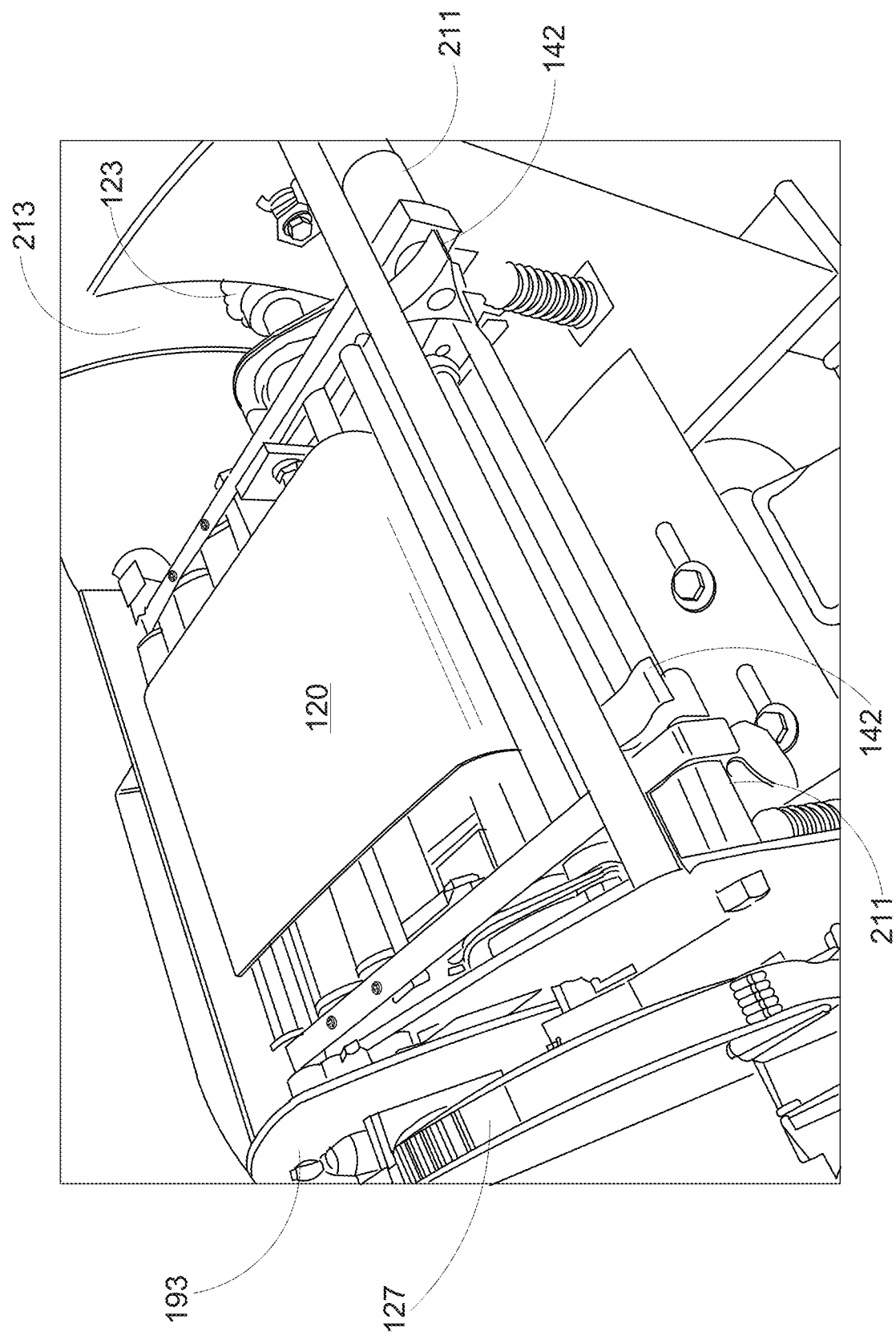
FIG. 21 is a rear perspective view showing an upper belt assembly cartridge held in place within the device/housing.

As seen in FIG. 21, the first belt assembly/cartridge 120 is held in place in a fixed position by fastening elements 142 to short bars 211. The first sprocket 123 also extends through the vertical cutout 222 in support wall 195. The driven pulley 127 is also present on the opposite side, extending through a similar vertical cutout in support wall 193.

In use, one of the belt assemblies is in a fixed position relative to the housing and the other belt assembly is floating to allow the distance between the belts at the nip to be changed to enable jam removal. For example, the upper belt assembly may be fixed and the lower belt assembly may be floating and connected to the jam removal system.

Figure 22:
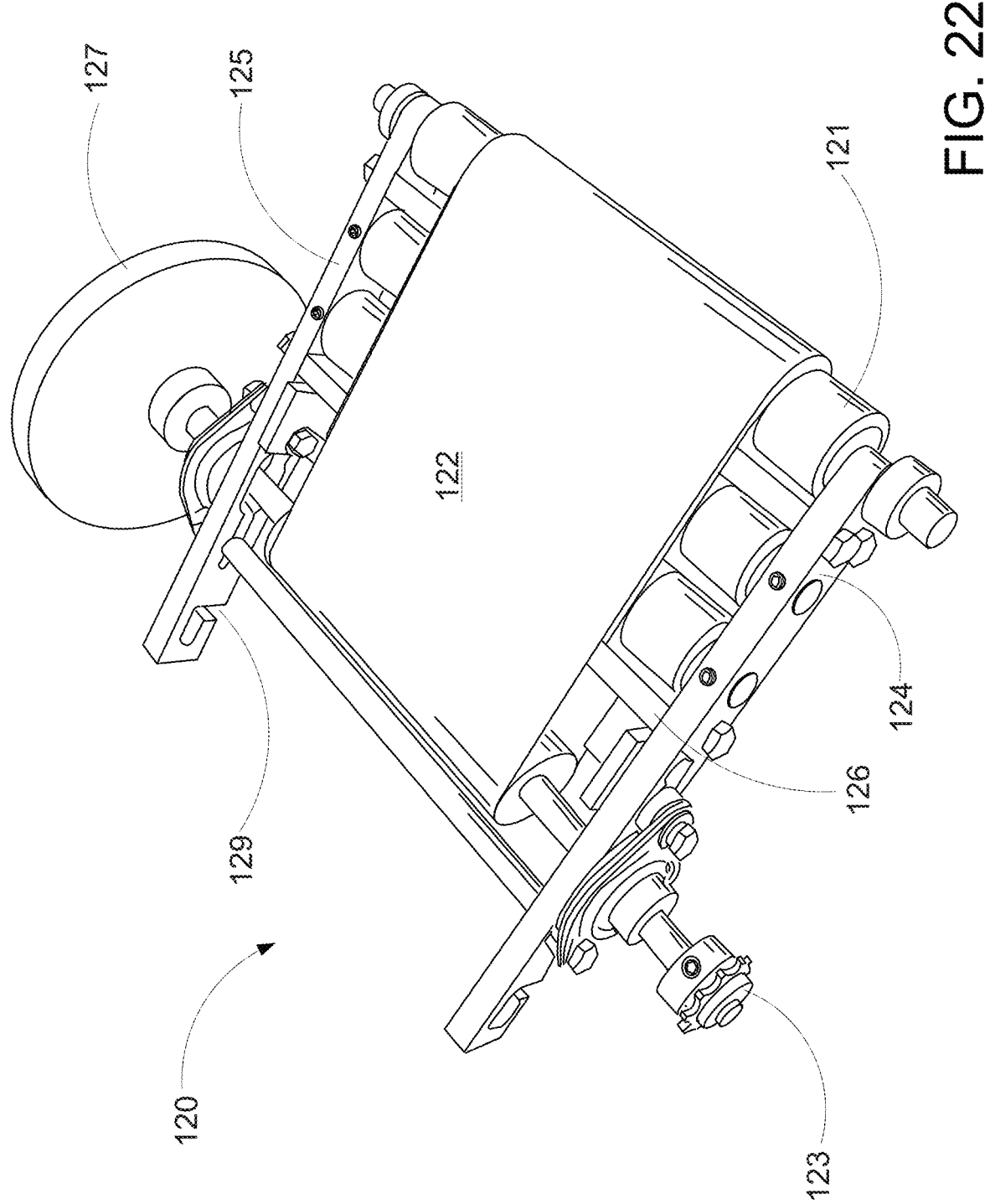
FIG. 22 is a perspective image of the upper belt assembly cartridge of FIG. 21.

FIG. 22 illustrates another embodiment of a first or upper belt assembly 120, which is also used in FIG. 21. This embodiment is very similar to the embodiment described in FIG. 8, and includes first rollers 121, a first gripper belt 122, a first sprocket 123, a first rail 124, a second rail 125, at least one first support bar 126, and possibly a driven pulley 127. The largest difference is in the first rail 124 and the second rail 125. In FIG. 8, the catch 129 extended upwards from the rail so that the rear end would hang from a support. In this embodiment, the catch 129 is in the form of an L-shaped notch which is entered from a lower side of the rail. As seen in FIG. 21, this catch engages fastening element 142 and short bar 211.

Figure 23:
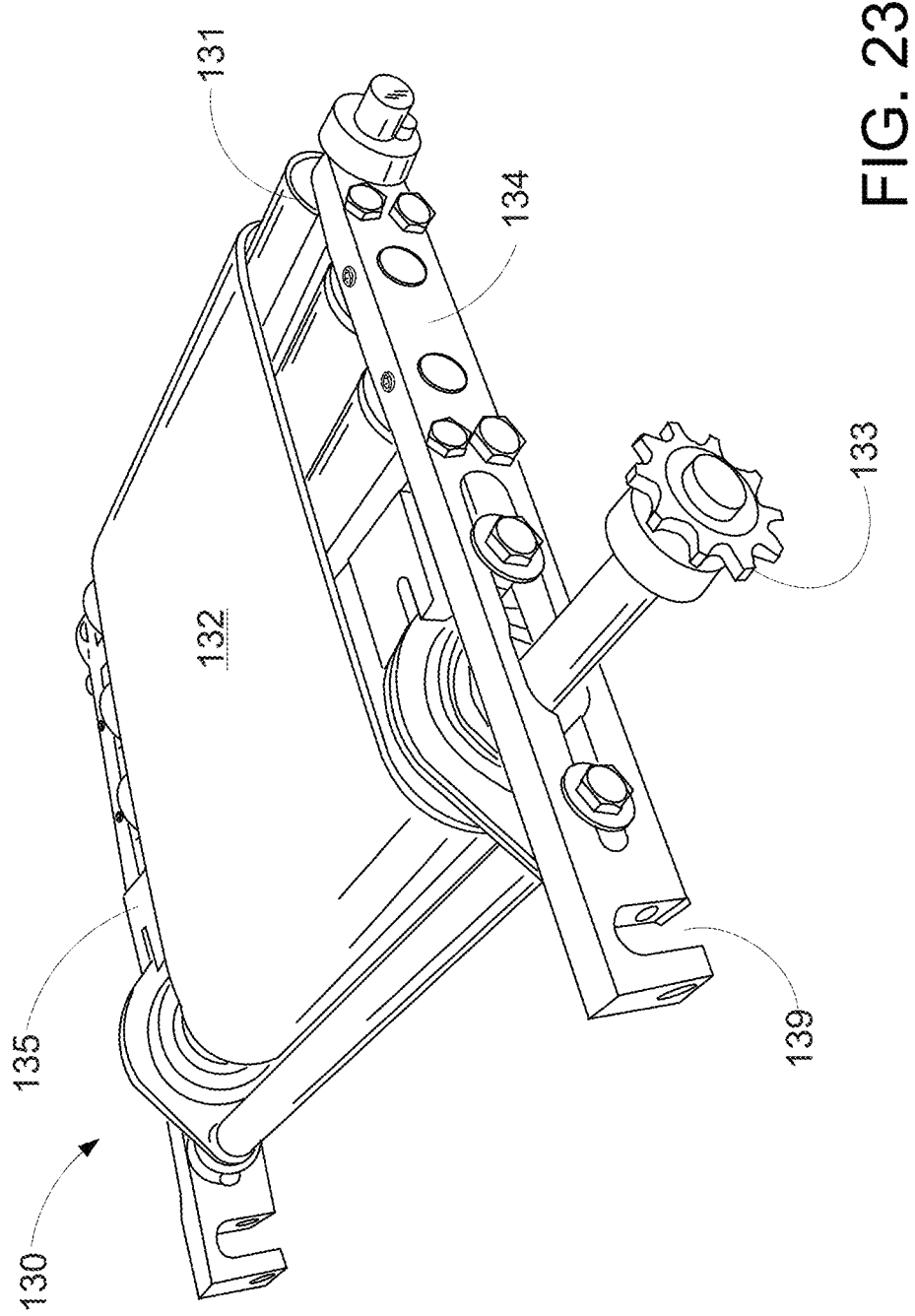
FIG. 23 is a perspective image of the lower belt assembly cartridge of FIG. 19.

FIG. 23 illustrates another embodiment of a second or lower belt assembly 130 in accordance with some embodiments of the present disclosure. This embodiment is very similar to the embodiment described in FIG. 10, and second rollers 131, a second gripper belt 132, a second sprocket 133, a first rail 134, a second rail 135, and one or more second support bars 136.

The largest difference is in the first rail 134 and the second rail 135. In FIG. 10, the aperture 139 extended sideways through the rail so that a hairpin would pass through the aperture. In this embodiment, the aperture 139 is in the form of a vertical notch which is entered from a lower side of the rail. As seen in FIG. 19, this aperture engages the rear upper support bar 225.

It should be understood that different aspects of the various different embodiments can be combined together, and such combinations are expressly contemplated.

Figure 24:
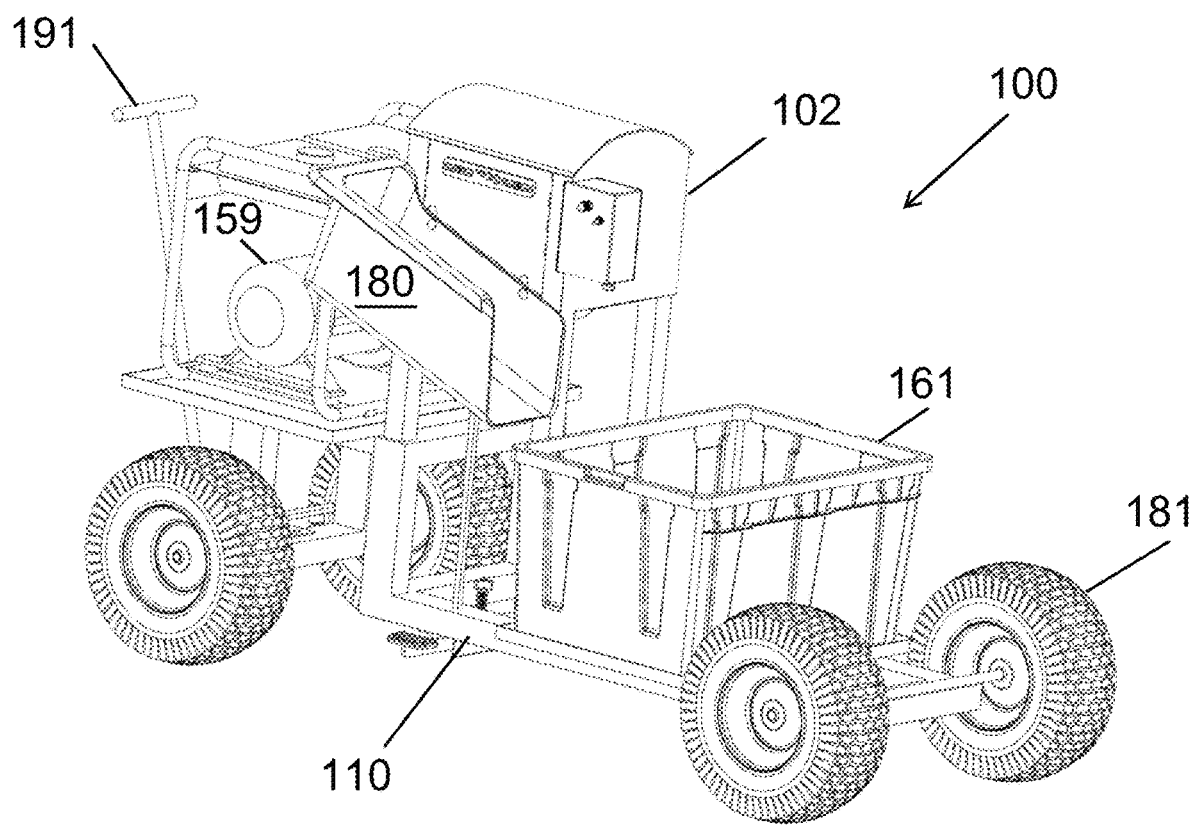
FIG. 24 is a front perspective view of a mobile version of the destemming device.

As another alternative, an outdoor off-road base is also contemplated for the destemming device. The base can receive the housing as described above and also a generator and a catch bin. The base includes a handle or other connector that can be pulled by hand on off-road tires. Alternatively, the base can be pulled by an all-terrain vehicle (e.g., a quad). FIG. 24 illustrates an embodiment of a destemming device 100 suitable for outdoor, off-road use in the form of a vehicle. The device 100 includes a base 110, wheels 181 attached to the base, a generator which acts as motor 159, and a housing 102 mounted on the base 110. Optionally, a removable receptacle 161 for catching plant matter from slide 180 can be included. The vehicle may be powered, or in other words the motor 159 can also provide power to the wheels 181. In other embodiments, separate motors could be used to power the wheels and the components in the housing. In some embodiments, the vehicle is unpowered, and may be equipped with a handle 191 for pushing/pulling.

In some embodiments, the entire belt assemblies are removable for cleaning. In other embodiments, only the belts of the belt assemblies are removed for cleaning. When only the belts are removed for cleaning, lower cost materials may be used for the other components of the belt assemblies since they are not submerged in cleaning solution.

The side cover panels may interlock with switches when fully installed. The top cover may hold the side covers in place if they do not have their own latching mechanism. The top side of the side cover panels may be held to the frame/housing via teardrop holes that fit over fasteners (e.g., screws). In some embodiments, the cover panels are made of aluminum or plastic. The cover panels may have a thickness of from about 1/32 inches to about 1/4 inches, including about 1/8 inches. The top cover panel may be curved and may be secured to the frame/housing via hooks on the backside and latches on the front side. A switch associated with the front latch may render the machine inoperable when the top cover panel is removed.

Devices which include only one belt assembly and an alternative structure is used instead of a second belt assembly are also contemplated. Examples of alternative structures include one roller or a plurality of rollers without a belt, or the like. In such structures, a nip is created between the one belt assembly and the roller(s).

Methods for destemming plant matter (e.g., hemp, cannabis) are also disclosed. The methods include feeding plant matter stem-first through a cutting aperture to a belt system as described herein. The belt system grips and pulls the stem through the interior of the device. The cutting aperture cuts the desired plant matter (e.g., buds) away from the stem. The desired plant matter may drop into a slide or receptacle (located on the exterior of the device) beneath the cutting aperture and be recovered. The stem may be ejected by the belt system through the back of the device and discarded. The stems at the backside and/or the destemmed plant matter at the front side may be filtered for size (e.g., using a plurality of layers of decreasing size hardware cloth grids). The size filters may be placed above or in a bin.

The present disclosure has been described with reference to exemplary embodiments. Modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A destemming device comprising:
 a housing comprising at least one cutting aperture;
 a motor; and
 a belt system configured to fit within the housing, the belt system comprising:
  a first belt assembly comprising:
   a first plurality of rollers; and
   a first gripper belt extending around the first plurality of rollers; and
  a second belt assembly comprising:
   a second plurality of rollers; and
   a second gripper belt extending around the second plurality of rollers;
 wherein the first gripper belt and the second gripper belt define a nip;
 wherein the at least one cutting aperture is aligned with the nip; and
 wherein the motor is operatively connected to the belt system.

2. The destemming device of claim 1, wherein the first belt assembly is an upper belt assembly and the second belt assembly is a lower belt assembly located vertically below the upper belt assembly.

3. The destemming device of claim 1, wherein the motor is operatively connected to the belt system via a power transmission belt extending around a drive pulley associated with the motor and a driven pulley associated with at least one roller of the first plurality of rollers or the second plurality of rollers.

4. The destemming device of claim 1, further comprising:
 a chain drive operatively connecting a first sprocket associated with at least one first roller of the first plurality of rollers and a second sprocket associated with at least one second roller of the second plurality of rollers.

5. The destemming device of claim 1, further comprising:
 a control unit electrically connected to the motor.

6. The destemming device of claim 5, further comprising:
 a user interface associated with the control unit, the user interface comprising:
 an on/off switch;
 an emergency stop button; and
 a dial for controlling belt speed.

7. The destemming device of claim 6, wherein the dial allows switching between a plurality of discrete belt speeds or permits selection of belt speed in a continuously variable manner between predetermined upper and lower limits.

8. The destemming device of claim 1, further comprising:
 a slide and/or receptacle outside the housing and beneath the at least one cutting aperture.

9. The destemming device of claim 1, further comprising:
 a jam removal system for increasing the nip to facilitate removing a jam.

10. The destemming device of claim 9, wherein the jam removal system comprises:
 a foot pedal operatively connected to at least one of the first belt assembly and the second belt assembly;
 wherein depressing the foot pedal causes an increase in the nip.

11. The destemming device of claim 10, wherein the jam removal system comprises:
 a first lever extending between the foot pedal and a base on the destemming device; and
 a second lever extending between the first lever and the second belt assembly.

12. The destemming device of claim 10, wherein the jam removal system comprises:
 a carriage vertically mounted on springs within the housing, wherein the second belt assembly is mounted on the carriage, and the carriage is connected to the foot pedal.

13. The destemming device of claim 1, further comprising:
 a base.

14. The destemming device of claim 13, further comprising:
 a plurality of support legs extending between the housing and the base.

15. The destemming device of claim 14, further comprising:
 a plurality of wheels connected to the base.

16. The destemming device of claim 1, wherein the first belt assembly comprises a first rail and a second rail, wherein the first plurality of rollers extends between the first rail and the second rail; and at least one support bar extending between the first rail and the second rail.

17. The destemming device of claim 16, wherein the first belt assembly is in a non-floating relationship with the housing.

18. The destemming device of claim 1, wherein the second belt assembly comprises a first rail and a second rail, wherein the second plurality of rollers extend between the first rail and the second rail; and at least one support bar extending between the first rail and the second rail.

19. The destemming device of claim 18, wherein the second belt assembly is in a floating relationship with the housing.

20. A destemming device comprising:
a housing comprising at least one cutting aperture;
a belt system comprising:
    a first belt assembly comprising:
        a first plurality of rollers; and
        a first belt extending around the first plurality of rollers; and
    a second belt assembly comprising:
        a second plurality of rollers; and
        a second belt extending around the second plurality of rollers; and
a motor that is operatively connected to the belt system;
wherein the first belt and the second belt define a nip that is aligned with the at least one cutting aperture; and
a base, a plurality of support legs extending between the housing and the base, and a plurality of wheels connected to the base.

\* \* \* \* \*

UNITED STATES PATENT AND TRADEMARK OFFICE
CERTIFICATE OF CORRECTION

| | | |
|---|---|---|
| PATENT NO. | : 11,304,436 B2 | Page 1 of 1 |
| APPLICATION NO. | : 17/466695 | |
| DATED | : April 19, 2022 | |
| INVENTOR(S) | : James David Jasiewicz | |

It is certified that error appears in the above-identified patent and that said Letters Patent is hereby corrected as shown below:

On the Title Page

Item (72) should read:
(72) Inventor: James David Jasiewicz, Torrance, CA (US)

Signed and Sealed this
First Day of November, 2022

*Katherine Kelly Vidal*

Katherine Kelly Vidal
*Director of the United States Patent and Trademark Office*